US010257247B2

(12) United States Patent
Denoual et al.

(10) Patent No.: US 10,257,247 B2
(45) Date of Patent: Apr. 9, 2019

(54) METHOD, DEVICE, AND COMPUTER PROGRAM FOR ENCAPSULATING AND PARSING TIMED MEDIA DATA

(71) Applicant: CANON KABUSHIKI KAISHA, Tokyo (JP)

(72) Inventors: Franck Denoual, Saint Domineuc (FR); Frédéric Maze, Langan (FR); Naël Ouedraogo, Maure de Bretagne (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/603,141

(22) Filed: May 23, 2017

(65) Prior Publication Data

US 2017/0346873 A1 Nov. 30, 2017

(30) Foreign Application Priority Data

May 27, 2016 (GB) .................................. 1609446.8

(51) Int. Cl.

| | |
|---|---|
| ***H04L 29/06*** | (2006.01) |
| ***H04N 19/70*** | (2014.01) |
| *H04N 19/184* | (2014.01) |
| *H04N 19/174* | (2014.01) |
| *H04N 19/167* | (2014.01) |

(52) U.S. Cl.

CPC ........... *H04L 65/607* (2013.01); *H04N 19/70* (2014.11); *H04L 65/4069* (2013.01); *H04N 19/167* (2014.11); *H04N 19/174* (2014.11); *H04N 19/184* (2014.11)

(58) Field of Classification Search

CPC .... H04N 19/70; H04N 19/174; H04N 19/184; H04N 19/167; H04N 19/46; H04N 19/17; H04L 65/607

See application file for complete search history.

(56) References Cited

U.S. PATENT DOCUMENTS

2015/0055703 A1* 2/2015 Pang .................... H04N 19/176 375/240.12

FOREIGN PATENT DOCUMENTS

GB 2513303 A 10/2014

* cited by examiner

*Primary Examiner* — Jamal Javaid

(74) *Attorney, Agent, or Firm* — Canon U.S.A., Inc. I.P. Division

(57) ABSTRACT

The invention relates according to one of its embodiments to a method for encapsulating a video bitstream organized into slice segments, the slice segments comprising a plurality of coding units, the method comprising:

obtaining a region of interest comprising one or more tiles, each tile comprising a set of one or more coding units;

determining whether the region of interest forms part of a slice segment;

if it is determined that the region of interest forms part of a slice segment, defining a new slice segment comprising the coding units of only the region of interest; and encapsulating the bitstream comprising the coding units of the region of interest using the new slice segment if it is determined that the region of interest forms part of a slice segment, and using the slice segment otherwise.

13 Claims, 17 Drawing Sheets

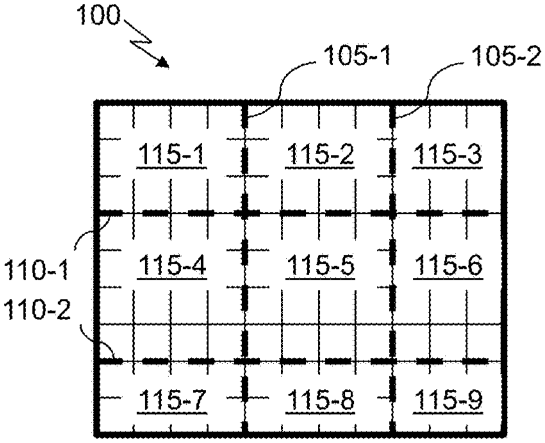
Fig. 1a
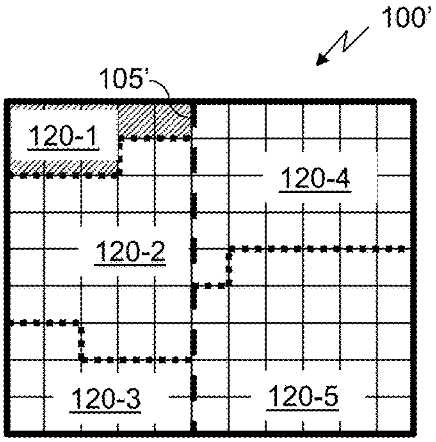
Fig. 1b
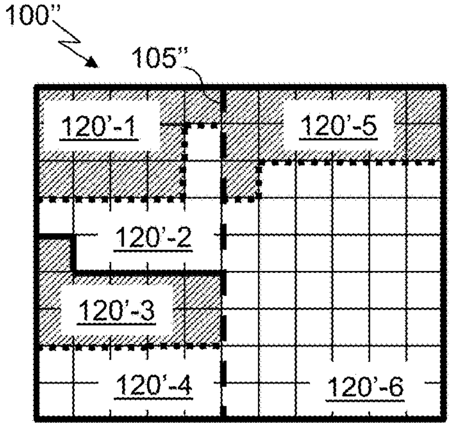
Fig. 1c
| | |
|---|---|
| Tile 1 | Tile 2 |
| Tile 3 | Tile 4 |
Fig. 2a

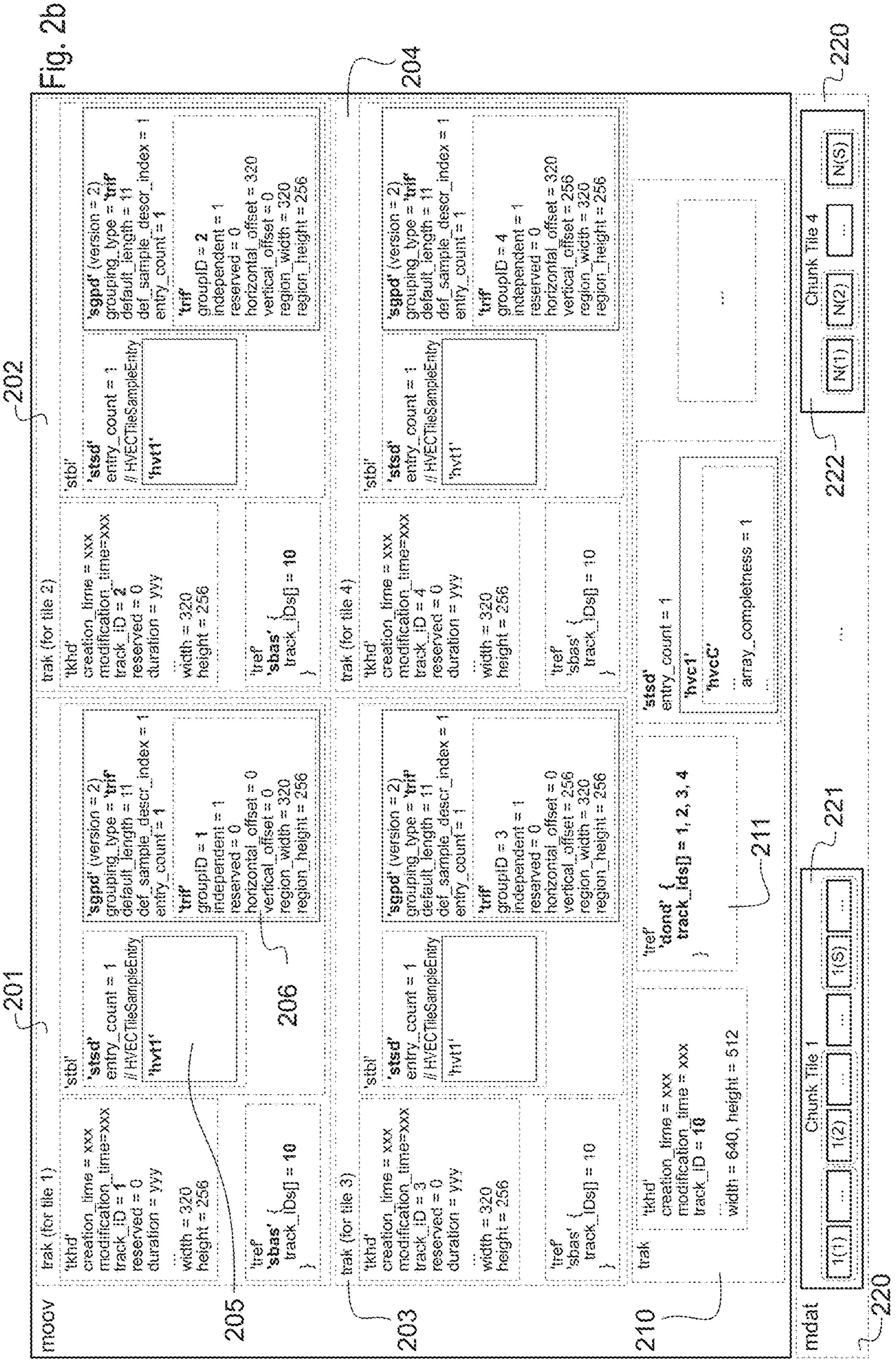

Fig. 2b moov trak (for tile 1) — 201
- 'tkhd'
  - creation_time = xxx
  - modification_time=xxx
  - track_ID = 1
  - reserved = 0
  - duration = yyy
  - width = 320
  - height = 256
- 'tref'
  - 'sbas' { track_IDs[] = 10 }
- 'stbl'
  - 'stsd'
    - entry_count = 1
    - // HVECTileSampleEntry
    - 'hvt1'
  - 'sgpd' (version = 2) — 205
    - grouping_type = 'trif'
    - default_length = 11
    - def_sample_descr_index = 1
    - entry_count = 1
    - 'trif'
      - groupID = 1
      - independent = 1
      - reserved = 0
      - horizontal_offset = 0
      - vertical_offset = 0
      - region_width = 320
      - region_height = 256
  — 206 trak (for tile 2) — 202
- 'tkhd'
  - creation_time = xxx
  - modification_time=xxx
  - track_ID = 2
  - reserved = 0
  - duration = yyy
  - width = 320
  - height = 256
- 'tref'
  - 'sbas' { track_IDs[] = 10 }
- 'stbl'
  - 'stsd'
    - entry_count = 1
    - // HVECTileSampleEntry
    - 'hvt1'
  - 'sgpd' (version = 2)
    - grouping_type = 'trif'
    - default_length = 11
    - def_sample_descr_index = 1
    - entry_count = 1
    - 'trif'
      - groupID = 2
      - independent = 1
      - reserved = 0
      - horizontal_offset = 320
      - vertical_offset = 0
      - region_width = 320
      - region_height = 256 trak (for tile 3) — 203
- 'tkhd'
  - creation_time = xxx
  - modification_time=xxx
  - track_ID = 3
  - reserved = 0
  - duration = yyy
  - width = 320
  - height = 256
- 'tref'
  - 'sbas' { track_IDs[] = 10 }
- 'stbl'
  - 'stsd'
    - entry_count = 1
    - 'hvt1'
  - 'sgpd' (version = 2)
    - grouping_type = 'trif'
    - default_length = 11
    - def_sample_descr_index = 1
    - entry_count = 1
    - 'trif'
      - groupID = 3
      - independent = 1
      - reserved = 0
      - horizontal_offset = 0
      - vertical_offset = 256
      - region_width = 320
      - region_height = 256 trak (for tile 4) — 204
- 'tkhd'
  - creation_time = xxx
  - modification_time=xxx
  - track_ID = 4
  - reserved = 0
  - duration = yyy
  - width = 320
  - height = 256
- 'tref'
  - 'sbas' { track_IDs[] = 10 }
- 'stbl'
  - 'stsd'
    - entry_count = 1
    - 'hvt1'
  - 'sgpd' (version = 2)
    - grouping_type = 'trif'
    - default_length = 11
    - def_sample_descr_index = 1
    - entry_count = 1
    - 'trif'
      - groupID = 4
      - independent = 1
      - reserved = 0
      - horizontal_offset = 320
      - vertical_offset = 256
      - region_width = 320
      - region_height = 256 trak — 210
- 'tkhd'
  - creation_time = xxx
  - modification_time = xxx
  - track_ID = 10
  - width = 640, height = 512
- 'tref'
  - 'tond' { track_ids[] = 1, 2, 3, 4 } — 211
- 'stsd'
  - entry_count = 1
  - 'hvc1'
  - 'hvcC'
    - array_completeness = 1 mdat — 220

Chunk Tile 1 — 221: 1(1) | 1(2) | ... | 1(S)

Chunk Tile 4 — 222: N(1) | N(2) | ... | N(S)

Fig. 3a
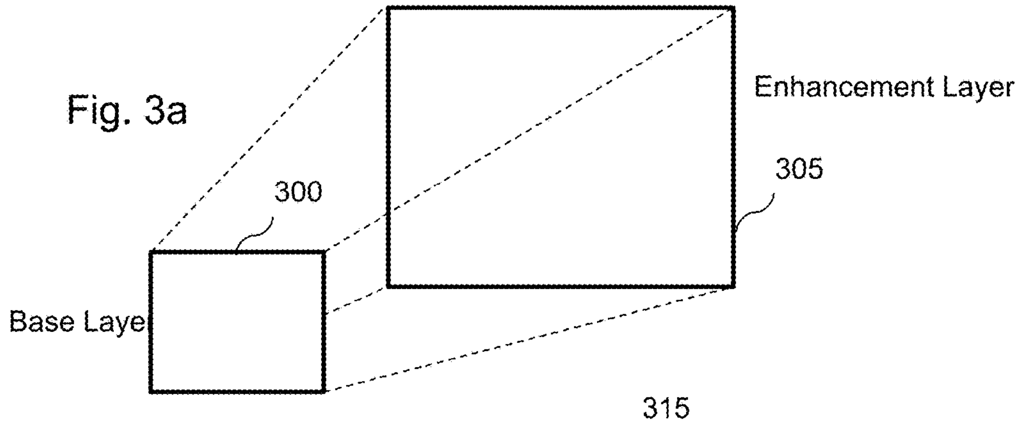
Fig. 3b
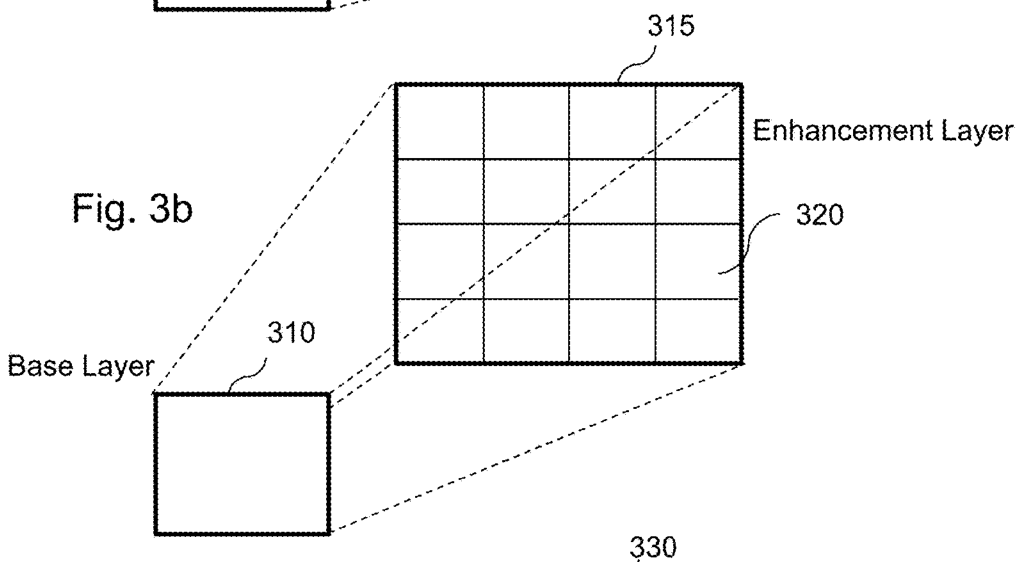
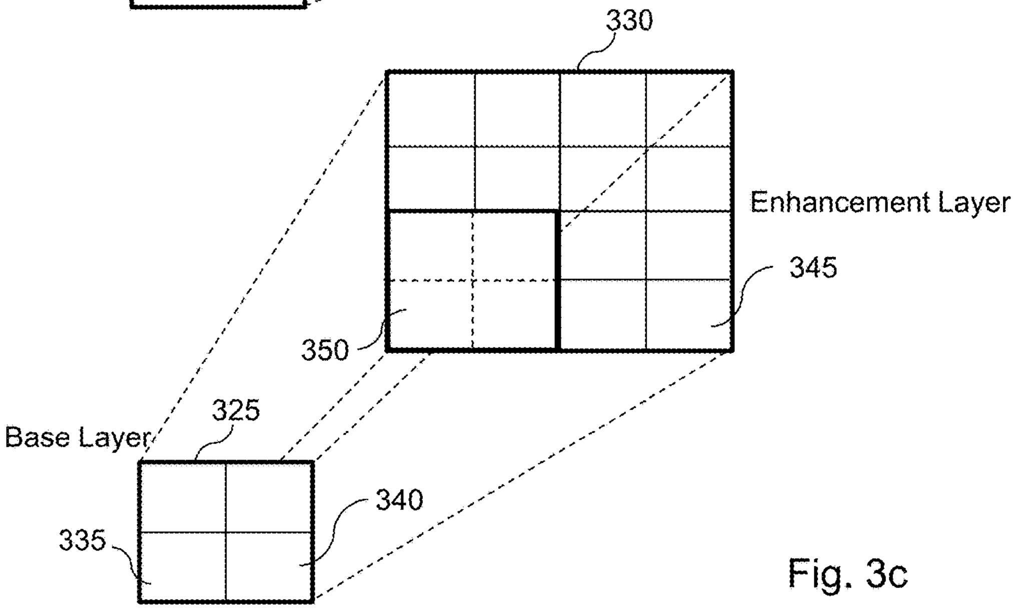
Fig. 3c

```
TileRegionGroupEntry() extends VisualSampleGroupEntry ('trif') {
        unsigned int(16) groupID;
        unsigned int(2)  independent_idc;
        unsigned int(1)  full_picture;
        unsigned int(1)  filtering_disabled;
        unsigned int(1)  tile_group ;
        unsigned int(1)  has_dependency_list;
        unsigned int(1)  has_irap_dependency_list;
        unsigned int(1)  reserved=0;
        if (tile_group) {
                unsigned int(16) tile_count;
                for (i=1; i<= tile_count; i++)
                        unsigned int(16) tileGroupID;
        } else {
        if (!full_picture) {
                unsigned int(16) horizontal_offset;
                unsigned int(16) vertical_offset;
        }
        unsigned int(16) region_width;
        unsigned int(16) region_height;
        }
        if (has_dependency_list) {
                unsigned int(16) dependency_tile_count;
                for (i=1; i<= dependency_tile_count; i++){
                        unsigned int(16)
dependencyTileGroupID;
                }
        }
        if (has_irap_dependency_list) {
                unsigned int(16) irap_dependency_tile_count;
                for (i=1; i<= irap_dependency_tile_count; i++){
                        unsigned int(16)
irap_dependencyTileGroupID;
                }
        }
}
```

```
class TileRegionEntry() extends VisualSampleGroupEntry ('tile') {
 unsigned int(16) region_id;
 unsigned int(16) horizontal_offset;
 unsigned int(16) vertical_offset;
 unsigned int(16) region_width;
 unsigned int(16) region_height;
}
```

602

```
class TileRegionGroupEntry() extends VisualSampleGroupEntry ('trif')
{
        unsigned int(1)  full_picture;
        unsigned int(7)  template=0;
        unsigned int(16) groupID;
        if (!full_picture) {
                unsigned int(16) horizontal_offset;
                unsigned int(16) vertical_offset;
        }
        unsigned int(16) region_width;
        unsigned int(16) region_height;
}
```

```
class TileRegionGroupEntry() extends VisualSampleGroupEntry ('trif') {
 unsigned int(16) groupID;
    unsigned int(2)  independent_idc;
    unsigned int(1)  full_picture;
    unsigned int(1)  filtering_disabled;
    unsigned int(1)  tile_group ;
    unsigned int(1)  has_dependency_list;
    unsigned int(1)  has_irap_dependency_list;
    unsigned int(1)  hidden;
 ...
```

METHOD, DEVICE, AND COMPUTER PROGRAM FOR ENCAPSULATING AND PARSING TIMED MEDIA DATA

CROSS REFERENCE TO RELATED APPLICATION

This application claims the benefit under 35 U.S.C. § 119(a)-(d) of United Kingdom Patent Application No. 1609446.8, filed on May 27, 2016 and entitled "Method, device, and computer program for encapsulating and parsing timed media data". The above cited patent application is incorporated herein by reference in its entirety."

FIELD OF THE INVENTION

The invention generally relates to the field of encapsulation and parsing of timed media data, e.g. according to Base Media File Format as defined by the MPEG standardization organization, to provide a flexible and extensible format that facilitates interchange, management, editing, and presentation of the media data and to improve stream delivery, in particular regarding HTTP (HyperText Transfer Protocol) and RTP (Real-time Transport Protocol) streaming of user-selected regions of interest in compressed video streams. The International Standard Organization Base Media File Format (ISO BMFF) is a well-known flexible and extensible format that describes encoded timed media data bitstreams either for local storage or transmission via a network or via another bitstream delivery mechanism. This file format is object-oriented. It is composed of building blocks called boxes that are sequentially or hierarchically organized and that define parameters of the encoded timed media data bitstream such as timing and structure parameters.

The file format can describe various video encoding formats such as AVC (Advanced Video Coding), SVC (Scalable Video Coding), HEVC (High Efficiency Video Coding) or L-HEVC (Layered HEVC).

HEVC and similar video encoding formats define different spatial subdivisions of samples, e.g. pictures: tiles, slices and slice segments. A tile defines a rectangular region of a picture that contains an integer number of Coding Tree Units (CTUs) or coding blocks, all referred to hereinafter coding units. As such, tiles are good candidates to represent regions of interest (ROI). However, coded video data (bitstream) organization in terms of syntax and its encapsulation into NAL (Network Abstraction Layer) units is rather based on slices and slice segments (as in AVC).

A slice in HEVC is a set of slice segments, with at least the first slice segment being an independent slice segment, the others, if any, being dependent slice segments. A slice segment contains an integer number of consecutive (in raster scan order) CTUs. It has not necessarily a rectangular shape (thus less appropriate than tiles for ROI representation). A slice segment is encoded in the HEVC bitstream as a slice_segment_header followed by slice_segment_data. Independent slice segments (ISS) and dependent slice segments (DSS) differ by their header: the dependent slice segment has a shorter header because reusing information from the independent slice segment's header. Both independent and dependent slice segments contain a list of entry points in the bitstream.

A problem arises when a slice segment, or equivalently a NAL unit, contains a number of tiles than span beyond the region of interest that we want to access, i.e. the tile or plurality of tiles of the region of interest constitute only part of the tiles of the slice segment. In this case, a tile-level access is complex since conventional syntax and encapsulation mechanisms for tile description are NAL unit based. Tile-based streaming becomes also impractical and not efficient since one has either to issue one specific HTTP request for the slice to get the byte-range corresponding to the tile or tiles of the ROI (not practical, since requesting on a sample basis), or to download the whole slice (potentially the whole picture) and extract ROI data at the client side. This latter is not efficient because of waste of network resources and computing resources at the client side for parsing, decoding, cropping the whole picture to render only the region of interest.

It is thus desired to handle efficiently tile-based bitstream extraction and tile-based streaming when a video encoder (like 1200 on FIG. 12) generates a video bitstream containing slice segments with multiple tiles. More particularly, there is a need for an encapsulation method that allows a direct and easy access to an ROI even if the ROI forms only part of a slice segment.

The present invention has been devised to address at least one of the foregoing concerns. In particular, there is provided an efficient data encapsulation so as to generate ISOBMFF files or segments that support tile-based addressing whatever the HEVC encoding configuration regarding tiles. This ensures that the result of the ISO BMFF parsing is more efficient and that the resulting file or segments can be put on a server for tile-based adaptive streaming.

SUMMARY OF THE INVENTION

It is a broad object of the invention to remedy the shortcomings of the prior art as described above.

According to a first aspect of the invention there is provided a method for encapsulating a video bitstream organized into slice segments, the slice segments comprising a plurality of coding units, the method comprising:

obtaining a region of interest comprising one or more tiles, each tile comprising a set of one or more coding units;

determining whether the region of interest forms part of a slice segment;

if it is determined that the region of interest forms part of a slice segment, defining a new slice segment comprising the coding units of only the region of interest; and encapsulating the bitstream comprising the coding units of the region of interest using the new slice segment if it is determined that the region of interest forms part of a slice segment, and using the slice segment otherwise.

According to a second aspect of the invention there is provided an apparatus for encapsulating a video bitstream organized into slice segments, the slice segments comprising a plurality of coding units, the apparatus comprising:

means for obtaining a region of interest comprising one or more tiles, each tile comprising a set of one or more coding units;

means for determining whether the region of interest forms part of a slice segment;

means for defining a new slice segment comprising the coding units of only the region of interest, the defining being performed if it is determined that the region of interest forms part of a slice segment; and means for encapsulating the bitstream comprising the coding units of the region of interest using the new slice segment if it is determined that the region of interest forms part of a slice segment, and using the slice segment otherwise.

This advantageously makes the extraction and tile-based streaming of an encapsulated video stream more efficient and practical.

In one implementation, the encapsulating comprising associating the new slice segment with a descriptor of the region of interest.

In one implementation, the associating is performed at sample level, or slice segment level.

In one implementation, the new slice segment is an independent slice segment or a dependent slice segment.

In one implementation, the new slice segment is displayable.

In one implementation, the new slice segment comprises one tile.

In one implementation, the new slice segment comprises a plurality of tiles.

In one implementation, the new slice segment maps the tiles of the region of interest.

In one implementation, the tiles of the region of interest are consecutive.

The invention also provides according to other aspects devices and computer programs for encapsulating and parsing partitioned timed media data.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

FIG. 1, comprising FIGS. 1*a*, 1*b* and 1*c*, illustrates examples of tiles and slice segments in an HEVC bitstream;

FIG. 2, comprising FIGS. 2*a* and 2*b*, illustrates an example of encapsulating tiles in multiple tracks;

FIG. 3, comprising FIGS. 3*a*, 3*b* and 3*c*, illustrates different examples of configurations of HEVC scalable bitstreams;

FIG. 5 illustrates the structure and features of a unified tile descriptor;

FIG. 6 shows two alternative examples of a generic (codec-agnostic) tile descriptor;

FIG. 9, comprising

FIG. 11, comprising

DETAILED DESCRIPTION OF EMBODIMENTS OF THE INVENTION

Figure 4:
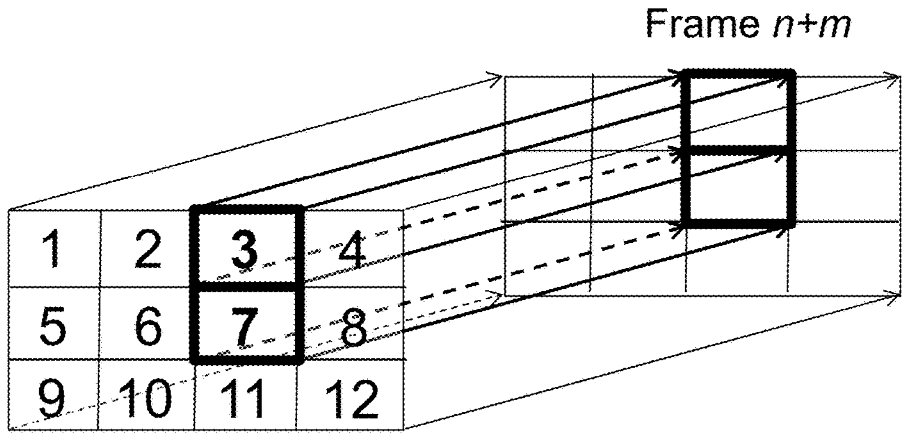
FIG. 4 illustrates a temporal pipe of tiles selected by a user to be displayed.

Embodiments of the invention can apply, for example, to the video format known as HEVC and to its layered extensions. In the following, HEVC is used to refer to both HEVC and to its layered extensions (L-HEVC).

According to the HEVC standard, images can be spatially divided into tiles, slices, and slice segments. In this standard, a tile corresponds to a rectangular region of an image that is defined by horizontal and vertical boundaries (i.e., rows and columns). It contains an integer number of Coding Tree Units (CTUs). Therefore, tiles can be efficiently used to identify regions of interest by defining, for example, positions and sizes for regions of interest. However, the structure of an HEVC bitstream as well as its encapsulation as Network Abstract Layer (NAL) units are not organized in relation to tiles but are based on slices.

In the HEVC standard, slices are sets of slice segments, the first slice segment of a set of slice segments being an independent slice segment, that is to say a slice segment whose general information stored within a header does not refer to that of another slice segment. The other slice segments of the set of slice segments, if any, are dependent slice segments (i.e. slice segments whose general information stored within a header refers to that of an independent slice segment).

A slice segment contains an integer number of consecutive (in raster scan order) Coding Tree Units. Therefore, a slice segment can be of a rectangular shape or not and so, it is not suited to represent a region of interest. It is encoded in an HEVC bitstream for a slice segment header followed by slice segment data. Independent and dependent slice segments differ by their header: since a dependent slice segment depends on an independent slice segment, the amount of information of its header is smaller than the one of an independent slice segment. Both independent and dependent slice segments contain a list of entry points in the corresponding bitstream that are used to define tiles or as entropy decoding synchronization points.

FIG. 1, comprising FIGS. 1*a*, 1*b*, and 1*c*, illustrates examples of tiles and slice segments. More precisely, FIG. 1*a* illustrates an image (100) divided into nine portions by vertical boundaries 105-1 and 105-2 and horizontal boundaries 110-1 and 110-2. Each of the nine portions referenced 115-1 to 115-9 represents a particular tile.

FIG. 1*b* illustrates an image (100') containing two vertical tiles delimited by vertical boundary 105'. Image 100' comprises a single slice (not referenced) containing five slice segments, one independent slice segment 120-1 (represented with hatched lines) and four dependent slice segments 120-2 to 120-5.

FIG. 1*c* illustrates an image (100") containing two vertical tiles delimited by vertical boundary 105". The left tile comprises two slices: a first slice containing one independent slice segment (120'-1) and one dependent slice segment (120'-2) and a second slice also containing one independent slice segment (120'-3) and one dependent slice segment (120'-4). The right tile comprises one slice containing one independent slice segment (120'-5) and one dependent slice segment (120'-6).

According to the HEVC standard, slice segments are linked to tiles according to rules that may be summarized as follows (one or both conditions have to be met):

all CTUs in a slice segment belong to the same tile (i.e. a slice segment cannot belong to several tiles); and all CTUs in a tile belong to the same slice (i.e. a tile may be divided into several slice segments provided that each of these slice segments only belongs to that tile).

For the sake of clarity, it is considered in the following that one tile contains one slice having only one independent slice segment. However, embodiments of the invention can be carried out with other configurations like the ones illustrated in FIGS. 1*b* and 1*c*.

As mentioned above, while tiles can be considered as an appropriate support for regions of interest, slice segments are the entities that are actually put in NAL units for transport over a communication network and aggregated to form access units (i.e. coded picture or samples at file format level).

It is to be recalled that according to the HEVC standard, the type of a NAL unit is encoded as part of the NAL unit header that is defined as follows:

```
nal_unit_header ( ) {
    forbidden_zero_bit
    nal_unit_type
    nuh_layer_id
    nuh_temporal_id_plus1
}
```

NAL units used to code slice segments comprise slice segment headers indicating the address of the first CTU in the slice segment thanks to a slice segment address syntax element. Such slice segment headers can be defined as follows:

```
slice_segment_header ( ) {
    first_slice_segment_in_pic_flag
    if(nal_unit_type >= BLA_W_LP && nal_unit_type <=
    RSV_IRAP_VCL23)
        no_output_of_prior_pics_flag
    slice_pic_parameter_set_id
    if (!first_slice_segment_in_pic flag){
        if (dependent_slice_segments_enabled_flag)
            dependent_slice_segment_flag
        slice_segment_address
    }
    if (!dependent_slice_segment_flag){
    [ . . . parameters for independent slice segments . . . ]
    }
    if ( tiles_enabled_flag | | entropy_coding_sync_enabled_flag ) {
            num_entry_point_offsets
            if ( num_entry_point_offsets > 0) {
                offset_len_minus1
                for ( i = 0; i < num_entry_point_offsets; i++ )
                    entry_point_offset_minus1[i]
            }
    }
    [ . . . ]
}
```

Tiling information, in particular whether tiles are present or not and their position and sizes, is provided in a PPS (Picture Parameter Set) NAL unit. The relation between a slice segment and a tile can then be deduced by decoding these parameters.

While spatial predictions are reset on tile borders (by definition), nothing prevents a tile to use temporal predictors from a different tile in the reference frame(s). Accordingly, to build independent tiles, motion vectors for the prediction units are advantageously constrained inside a tile, during encoding, to remain in the co-located tile in the reference frame(s). In addition, the in-loop filters (deblocking and sample adaptive offset (SAO) filters) are preferably deactivated on the tile borders so that no error drift is introduced when decoding only one tile. It is to be noted that such a control of the in-loop filters is available in the HEVC standard. It is set in slice segment headers with a flag known as loop_filter_across_tiles_enabled_flag. By explicitly setting this flag to zero, the pixels at the tile borders cannot depend on pixels that fall on the border of the neighbor tiles. When these two conditions relating to motion vectors and to in-loop filters are met, tiles can be considered as "independently decodable tiles" or "independent tiles".

When a video bitstream is encoded as a set of independent tiles, this then enables a tile-based decoding from one frame to another without any risk for missing reference data or propagation of reconstruction errors. This configuration then makes it possible to reconstruct only a spatial partition of the original video that can correspond, for example, to the region of interest illustrated in FIG. 4 (comprising tiles 3 and 7). Such a configuration can be indicated as supplemental information in a video bitstream so as to indicate that tile-based decoding is reliable.

FIG. 2, comprising FIGS. 2*a* and 2*b*, illustrates an example of encapsulating tiles in multiple tracks using a tile descriptor.

FIG. 2*a* illustrates an example of tile configuration. For the sake of illustration, it comprises four tiles (tile 1 to tile 4), the size of each tile being of 320 pixel width and 256 pixel height.

FIG. 2*b* illustrates an example of encapsulating the four tiles represented in FIG. 2*a* into independent tracks according to the ISOBMFF file format. As illustrated, each tile is encapsulated in its own track, enabling efficient data addressing and leading to encapsulating the video as 5 tracks: four tile tracks referenced 201, 202, 203, and 204 for encapsulating each tile and one tile base track 210 containing parameter sets (also referred to as base track or base tile track in the description). This tile base track is common to all tile tracks or to a subset of tracks referencing it through the 'tbas' track reference type. This encapsulation is interesting for tile-based streaming: a client interested in one tile can issue request for this track and the tile base track. In particular, it combines well with adaptive streaming formats splitting a video sequence into temporal segments since tile tracks can also be split into multiple track fragments. Each or a set of consecutive track fragments is then addressable as a segment, for example a DASH media segment, thus providing tile-based streaming. This kind of segment would be a media segment containing tile information.

The description of each tile track (201, 202, 203, and 204) is based on a TileRegionGroupEntry box (identified by the 'trif' reference), such as TileRegionGroupEntry box 206.

Here, the 'trif' boxes use the default sample grouping mechanism (with attribute default_sample_description_index=1, noted def_sample_descr_index=1 in the FIG. 2*b*) to associate all the samples of the tile track to the appropriate TileRegionGroupEntry or TileSetGroupEntry. For example, the NAL units 221 corresponding to tile 1 are described in track 1 (referenced 201) in the TileRegionGroupEntry box 206.

There is no need here for a NALUMapEntry descriptor since all samples in a given track map to the tile described by this track. References 221 and 222 designate, respectively, data chunks that contain data for tile 1 and tile 4 from time 1 to time S (duration of the media file or media segment in case of track fragments).

Actually the track samples are not conventional video samples since in this embodiment, they are tile samples: a sample stored in a tile track is a complete set of slices for one or more tiles, as defined in ISO/IEC 23008-2 (HEVC). This excludes parameter sets, SEI messages, and other non-VCL NAL units. An HEVC sample stored in a tile track is considered as a sync sample if the VCL NAL units in the sample indicate that the coded slices contained in the sample are Instantaneous Decoding Refresh (IDR) slices, Clean Random Access (CRA) slices, or Broken Link Access (BLA) slices. As such, they do not have the same sizes as conventional samples would have: according to the example of FIG. 2*a*, conventional HEVC samples would have a size of 640×512 pixels while here, the HEVC samples stored in each tile track have a size of 320×256 pixels. In order to avoid ambiguity at parsing time, the tile samples are signaled with a new type of VisualSampleEntry descriptor: the HEVCTileSampleEntry descriptor, such as HEVCTileSampleEntry descriptor 205 associated with track 1 (designated with 4-letter code 'hvt1').

Formally, the sample entries of HEVC video tracks are HEVCSampleEntries declared in the sample description box of each track header. Here, since multiple tracks representing the same video stream are used, each tile track comprises an indication that the samples in the track are actually samples of a sub part of a complete video stream, indicating that these samples are samples of the HEVCTileSampleEntry type (each 'hvt1' box in the Sample Description box 'stsd' of each track). Then, the decoding of a tile track does not involve any layout operation, and the tile is decoded at the same place in the video decoder memory as if all tiles were decoded. Then the layout information in the track header of a tile track are set identical to the track header information of the associated base track as identified by the 'tbas' track reference type. Otherwise, the tile track should be ignored. Additionally, visual information in a tile track does not differ from the visual information in its related base track. This means that a selected tile in the middle of a video would be rendered in the middle of the video with empty data around it. Obtaining the tile and rendering it at client side as a full-frame video either requires system level composition information or bitstream transcoding to modify the size of the video in the Picture Parameter Set as well as tile addresses.

For the sample description type 'hvt1', neither the samples in the tile track or the sample description box can contain VPS, SPS or PPS NAL units. These NAL units must be in the samples or in the sample description box of the track containing the base layer (as identified by the track references) in case of scalability or in a dedicated track such as dedicated track 210 in FIG. 2*b*.

Sub-sample and sample grouping defined for regular HEVC samples have the same definitions for an HEVC tile sample. There may be dependencies between the tile base track 210 and the tile tracks (for example when one wants to have 210 as an extraction track providing a main entry point in the media file). When present, these are preferably described using a track reference box "trer" of 'type' scar referenced 211 (or any other four-byte code signaling an extractor-based tiling dependency). The tile base track 210 may also just contain common information to all or a subset of tile tracks and be referenced from these all or subset of tile tracks. In such case, there is no need for track reference box 211. Another alternative for the tile base track can be to explicitly declare dependencies but without extractors, for example using a track reference type like 'dond'. Yet another alternative can be to rely on implicit reconstruction (i.e. no extractor in the tile base track) and to declare 'sabt' reference from tile base track to all or a subset of tile tracks in their reconstruction order.

HEVC video coding standard supports multi-layer video encoding for multi-view or scalable applications. In this case, a given layer can be used as reference data for one or more other layers.

FIG. 3, comprising FIGS. 3*a*, 3*b*, and 3*c*, illustrates different examples of configurations of HEVC scalable bitstreams.

FIG. 3*a* is an example of a spatially scalable video bitstream comprising a base layer 300 and an enhancement layer 305. Enhancement layer 305 is encoded as a function of base layer 300. In such a video bitstream format, there exists a picture to picture dependency since none of the base and enhancement layers contains tiles.

FIG. 3*b* illustrates another example of a scalable video bitstream comprising a base layer 310 and an enhancement layer 315. According to this example, enhancement layer 315 is a tiled enhancement layer comprising, in particular, tile 320. In such a video bitstream format, there exists a tile to picture dependency since tiles of the enhancement layer depend on the base layer.

FIG. 3*c* still illustrates another example of a scalable video bitstream comprising a base layer 325 and an enhancement layer 330. According to this example, base layer 325 is a tiled base layer comprising, in particular, tiles 335 and 340, and enhancement layer 330 is a tiled enhancement layer comprising, in particular, tile 345 and tile set 350. Base layer 325 can be spatially enhanced with enhancement layer 330. In such a video bitstream format, there exists a tile to tile dependency since tiles of the enhancement layer depend on tiles of the base layer. There also exists a tile set to tile dependency since a tile set of the enhancement layer depends on tiles of the base layer. For the sake of illustration, tile 345 depends on tile 340 and tile set 350 depends on tile 335. Other dependencies may exist such as a tile to tile set dependency or a tile set to tile set dependency.

It is to be noted that similar configurations exist for a SNR scalable layer which may or may not be tiled on top of a base layer which also may or may not be tiled.

FIG. 4 illustrates a temporal pipe of tiles selected by a user to be displayed. More precisely, FIG. 4 represents a first video frame n and a second video frame n+m (where n and m are integer values), each of the first and second video frames comprising twelve tiles numbered 1 to 12. For the sake of illustration, only the third and seventh tiles are to be displayed (as denoted with bold lines) amongst these twelve tiles. Video frames n and n+m belong to a series of consecutive frames corresponding to a given temporal period. Therefore, the third and seventh tiles of each frame from frame n to frame n+m are displayed consecutively.

However, the data of a video bitstream conforming to the standard ISOBMFF are organized as temporal samples that correspond to full frames. Accordingly, it is required to access several small byte ranges for each frame when particular spatial areas of these frames are to be accessed during a given period of time as described above by reference to FIG. 4. This is inefficient in HTTP streaming in terms of the number of generated requests and in terms of data overhead. It is also less efficient for bitstream extraction for RTP streaming because it requires multiple small file seeking operations.

Therefore, to provide a more efficient access in compressed videos for ROI streaming, the timed media data bitstream is to be reorganized so that data of a particular tile is organized as a contiguous byte range (forming a pipe) for a given time period (i.e. a set of consecutive frames).

Accordingly, when only a spatial partition of video frames is to be displayed, only pipes of tiles corresponding to the selected spatial area must be downloaded (for instance tiles 3 and 7 in FIG. 4) using one HTTP request per pipe and per time period. Similarly, in RTP streaming, a server can extract more efficiently bigger data chunks from a source such as a hard disk, corresponding to a pipe of tiles.

Figure 8:
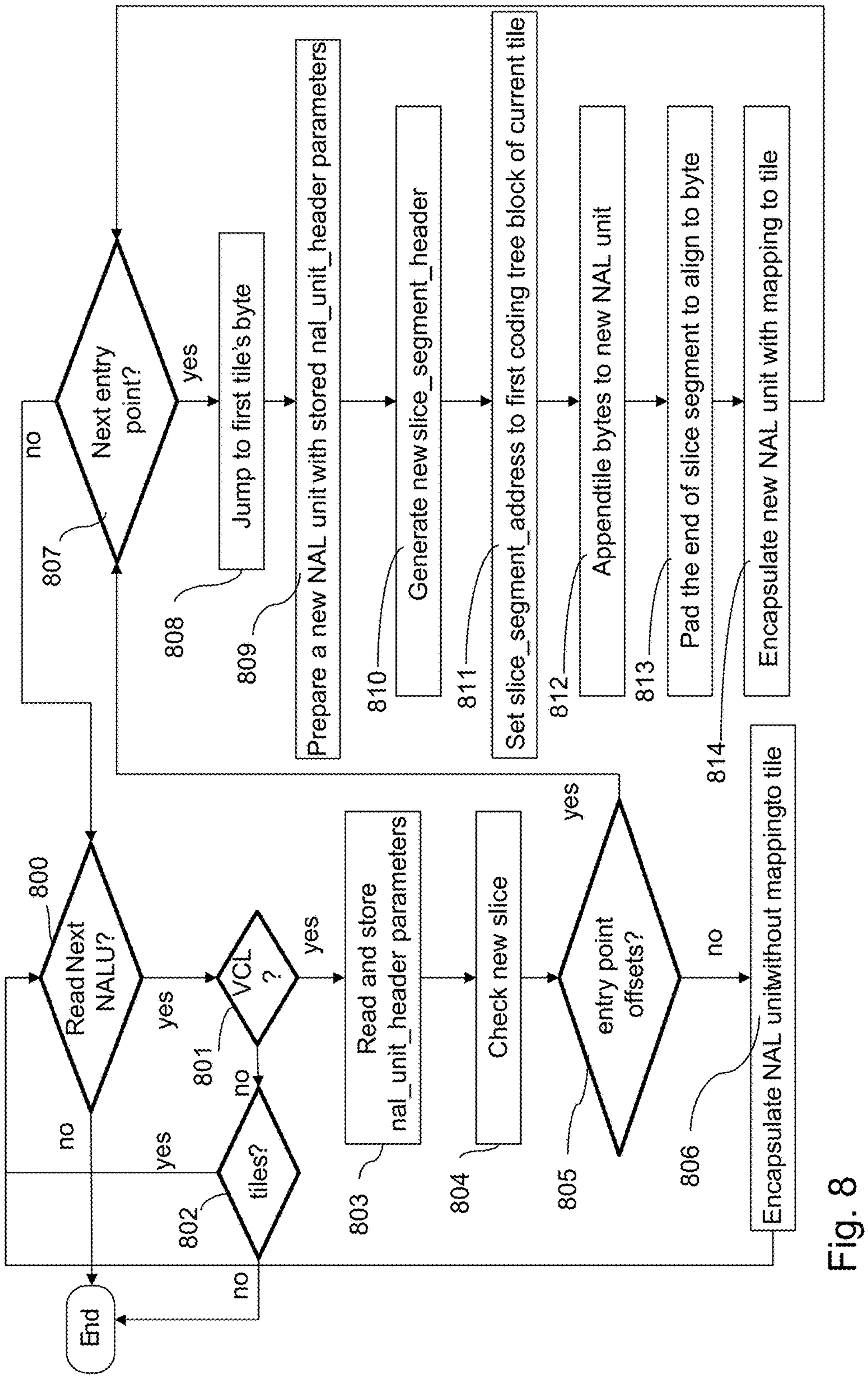
FIG. 8 is a flowchart representing a method for encapsulating tiled video bitstream representing a partitioned timed media data according to an embodiment of the invention.

FIG. 8 is a flowchart representing a method for encapsulating tiled video bitstream representing a partitioned timed media data according to an embodiment of the invention.

Figure 12:
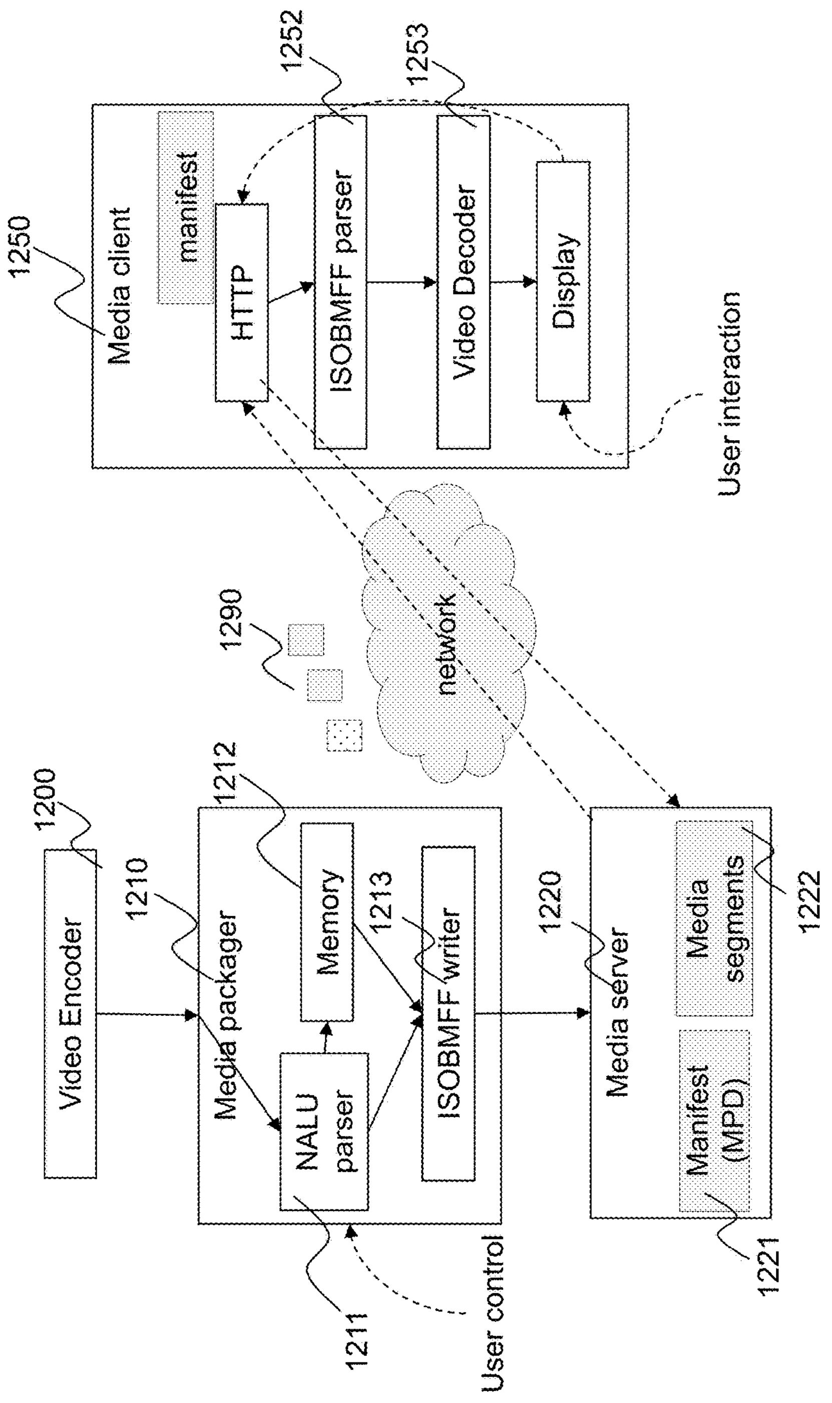
FIG. 12 illustrates a client server system adapted to embody the invention according to its different embodiments.

Reference can be made to FIG. 12 which illustrates a client server system adapted to embody the invention according to its different embodiments. The system comprises at one side: a video encoder 1200, a media packager 1210, a NALU parser 1211 a memory 1212, a ISOBMFF (mp4) writer 1213, a media server 1220 embedding a manifest (MPD) 1221 and media segments 1222. The system further comprises at client side a media client 1250 with different modules (ISOMBFF parser 1252, video decoder 1253, display, etc.).

Back to the description of FIG. 8, the method is performed by an encapsulation or packaging module (1212 on FIG. 12, also referred to as 'mp4 writer' or 'ISOBMFF writer' as 1213 on FIG. 12) comprising software code, when executed by CPU 1004 of server apparatus.

Typically, the encapsulation module is in charge of reading high-level syntax of a video bitstream to extract and identify (the VCL NAL units and non-VCL NAL units) and organize encoded data in a ISOBMFF file or segments (1222 on FIG. 12) containing the video bitstream as one or more tracks with descriptive metadata (the ISOBMFF box hierarchy) and potentially with one or more other synchronized media tracks (for example, audio, subtitles, text, metadata . . . ).

The encapsulation process starts with step 800 by reading from the video bitstream the next NAL unit (NALU), e.g. looking for next start code prefix for example. The process stops when no more NAL units remain to be read. When a NAL unit is found (test 800 is true), a NAL unit parser 1211 in the mp4 writer 1213 reads and stores the nal_unit_header information and uses this information to identify, at step 801, whether the NALU is a VCL NAL unit or not (using the nal_unit_type). In case the NALU is a non-VCL NAL unit, the information is put in the appropriate ISOBMFF box, and a test is performed at step 802 to determine whether tiles are present in the video bitstream or not. This information may be obtained from a non-VCL NALU of type Picture Parameter Set. If no tiles are present, the process ends as no tiles of interest are present in the bitstream. In one implementation, the Temporal motion-constrained tile sets SEI (Supplemental Enhancement Information) message can be useful to learn on tile organization (single tile or group of tiles, also called tile sets) and whether they are independently coded or not. In case the NALU is a VCL NAL unit, the nal_unit_header is read and stored in memory of the mp4 writer 1213 at step 803. At step 804, the NAL unit parser 1211 checks whether it is a new slice or not. For that, the nal_unit_type indicates whether it is a slice segment or not. The NAL unit parser 1211 then inspects the slice_segment_header information. The first_slice_segment_in_pic_flag indicates whether it is a new picture or not. If set to 1, the NAL unit parser 1211 knows it is a new slice, thus leading to the creation of one or more new samples in the ISOBMFF file or segment. If the flag is not set, the NAL unit parser 1211 of the mp4 writer 1213 has to inspect further the slice_segmen_header to determine whether the current slice segment is a dependent slice segment or independent slice segment (test 805). This is indicated by the dependent_slice_segment_flag. In case the test is true, this also means that the NAL unit is the one for a new slice. This information (dependent or independent slice segment and new slice or not, length and data of the parsed slice_segment_header) is recorded in memory of the mp4 writer 1213 for future use. The next step consists for the NAL unit parser 1211 of the mp4 writer 1213 to inspect or decode the slice_segment_header to check whether some entry_point_offsets are declared or not in 805. This information is determined from inspecting or decoding the slice_segment_header. If no entry point offsets are present in a new slice (result of the check at step 804 is true and test 805 false), this means that this new slice contains only one tile and then the NAL unit for the current slice segment is directly encapsulated with no modification at step 806 and without a direct mapping to a tile (through sample group or NALUMapEntry). If there are entry points (test 805 true), this means that there are multiple tiles in the slice. This is determined by further parsing and decoding of the current slice_segment_header. The position of each entry point for the slice segment are stored in the memory of the mp4 writer 1213 the list of entry points for the current slice segment is modified to indicate that no entry points are present anymore. The specific case where the result of the check at step 804 indicates that the NAL unit does not correspond to a new slice, the parser further checks if there are entry point offsets for this dependent slice segment. If it is not the case the NAL unit is directly encapsulated without any modification and without direct mapping to a tile at 806. When one slice segment is detected to have entry point offsets, (assuming the bitstream contains tiles as checked at step 802), the corresponding NAL unit follows a particular encapsulation from step 807. Step 807 consists in checking whether an entry point (i.e. an encoded tile in the slice segment) is to be processed or not. In case no entry point is to be processed, the encapsulation of the NAL unit terminates. When one entry point is to be processed, it is performed according to the following steps. The mp4 writer 1213 reads from its memory (stored when 805 is true) the position of the current entry point and sets its internal NAL unit parser 1211 to this position at step 808. The mp4 writer 1213 also prepares a new NAL unit in 809, preparing the nal_unit_header information, reusing the ones obtained in 803. It then generates according to a first embodiment a slice_segment_header for an independent slice segment, as illustrated on FIG. 9. A new slice segment address is computed at step 811 so that it encodes the position of the first coding tree block of the current tile. This position requires the NALU parser to implement and apply the slice address and coding tree block address rules. Then, the bytes corresponding to the entry point are appended to the new NAL unit as slice_segment_data at step 812. At step 813, an end of slice segment is also appended and when necessary, padding bytes until the next byte boundary are written in a way compliant with HEVC. Finally at step 814, the NAL unit is encapsulated by the mp4 parser according to encapsulation settings (for example one tile per track) and with a direct mapping of this new NAL unit to the corresponding tile. The tile is described with a 'trif' descriptor and the NAL unit is mapped through the sample grouping (if one tile per track) or through a NALUMapEntry (if multiple tiles per track). This encapsulation remains ISOBMFF compliant and when parsed by an mp4 reader 1252 would extract a compliant HEVC bitstream that a tile-aware video decoder could properly decode (tile-aware means a decoder capable of decoding a subset of independent tiles from a tiled video).

In summary, the mp4 writer 1213 when receiving a video bitstream checks whether it is tiled or not and determine whether some slice segments contains more than one tile. When it is the case, these slice segments are further decomposed into slice segments so that these new slice segments contain the tile or rectangular region to extract. For the latter case (rectangular region): only consecutive tiles can be aggregated into the new slice segment to keep video decoding error-free.

Figure 13:
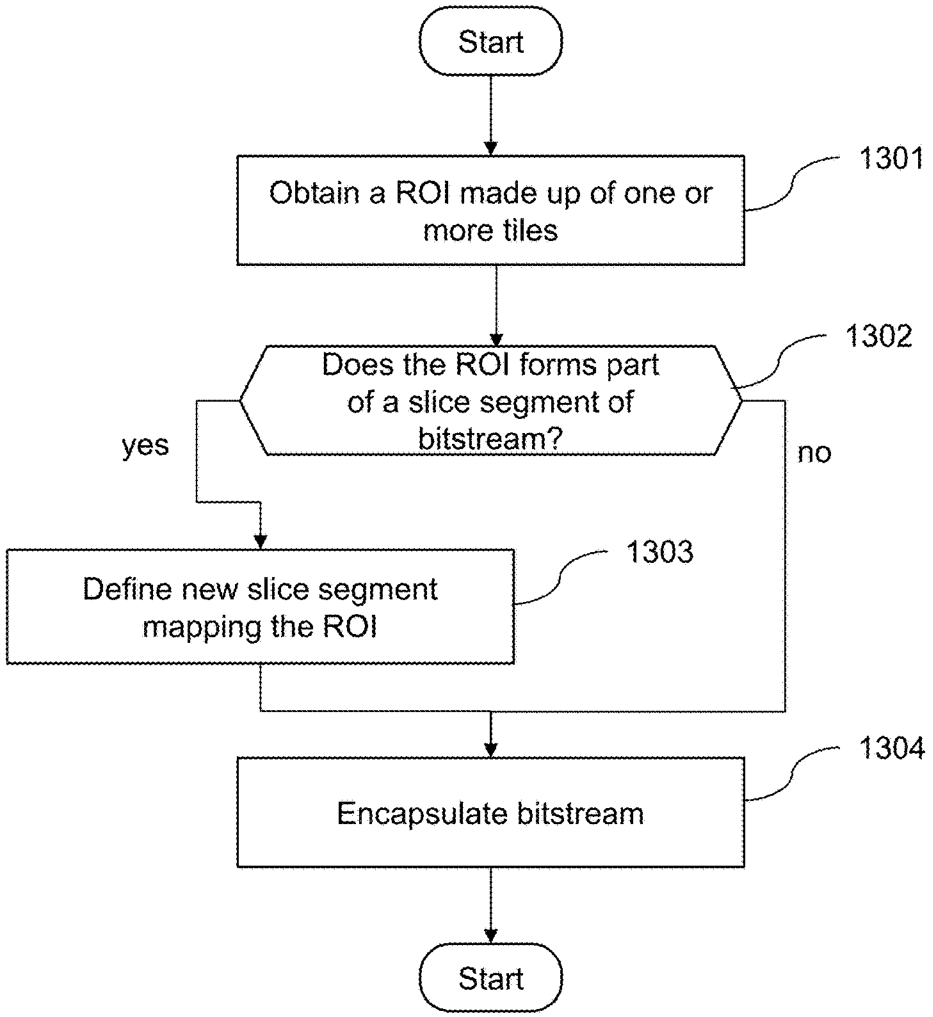
FIG. 13 is a general flowchart for encapsulating tiled video bitstream according to an embodiment of the invention.

FIG. 13 is a flowchart for encapsulating tiled video bitstream according to an embodiment of the invention. Some of the steps of the flowchart of FIG. 8 are summarized into steps of FIG. 13.

At step 1301, a region of interest is obtained. The ROI corresponds to the region to access and to render for example. The ROI is defined by a tile or a plurality of tiles.

At step 1302, a test is performed to determine whether the ROI forms part of a slice segment of the bitstream. This corresponds for example to steps 800-805 of FIG. 8. If the test 1302 is positive ("yes"), a new slice segment is defined containing all the tiles (if consecutive) or a subset of the tiles (if non consecutive) of the ROI (step 1303). This corresponds for example to steps 807-813 of FIG. 8. In case of non consecutive tiles, additional new slice segments are similarly defined to contain the other subsets of the tiles of the ROI.

At step 1304, the tiles of the ROI, either after the new slice segment mapping of step 1303 or not, within the bitstream are encapsulated. This corresponds for example to step 814 of FIG. 8.

Figure 9A:
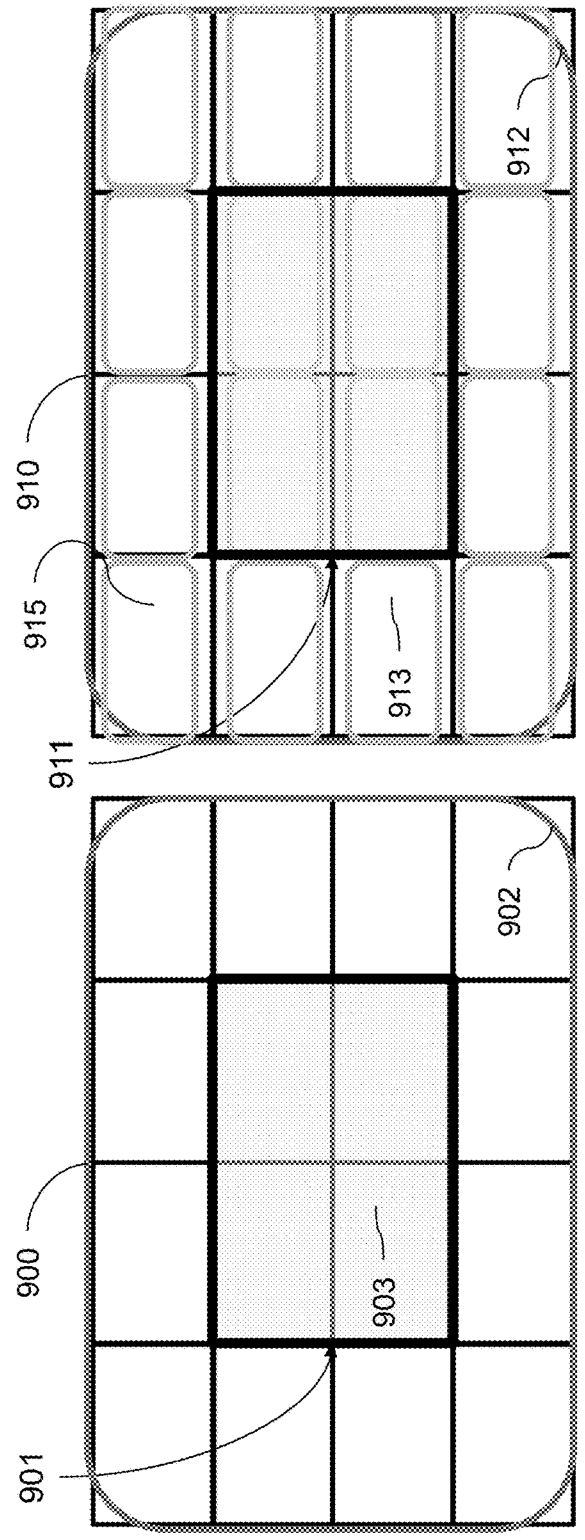
FIGS. 9*a*, 9*b* and 9*c*, illustrates different partitioning examples of pictures forming the video sequence.
Figure 9B:
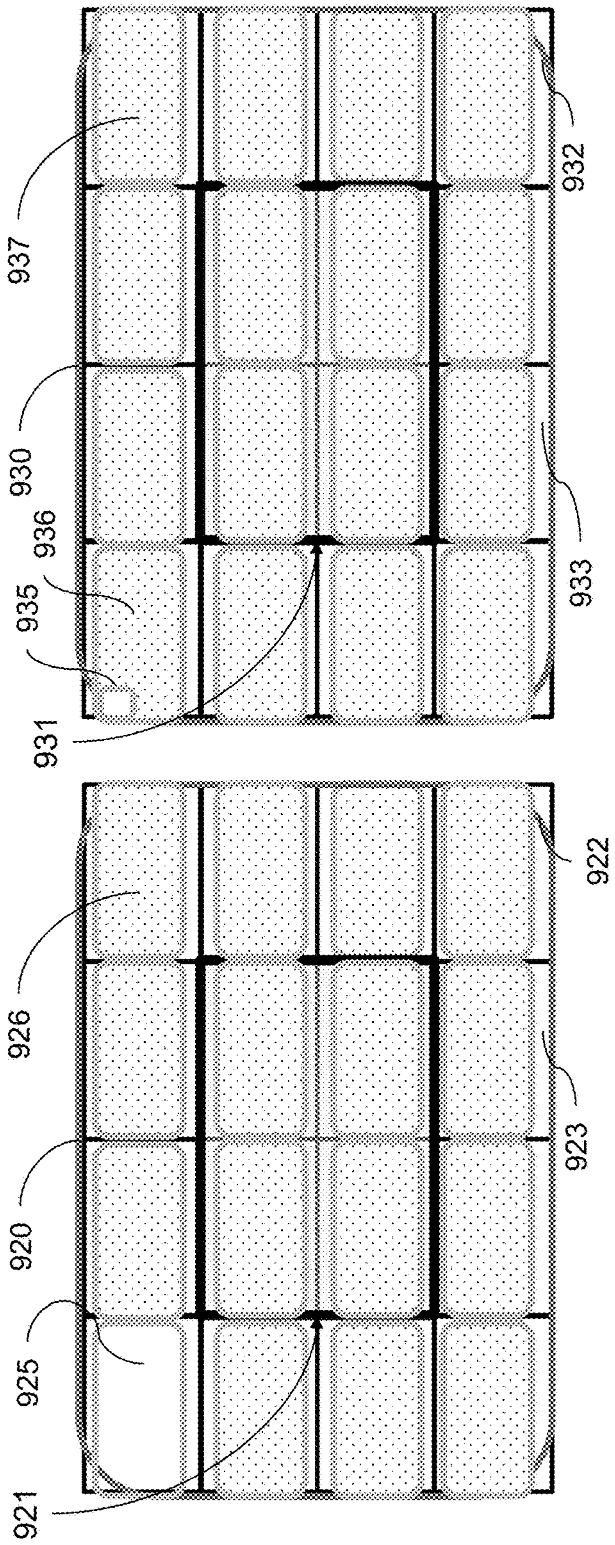
Figure 9C:
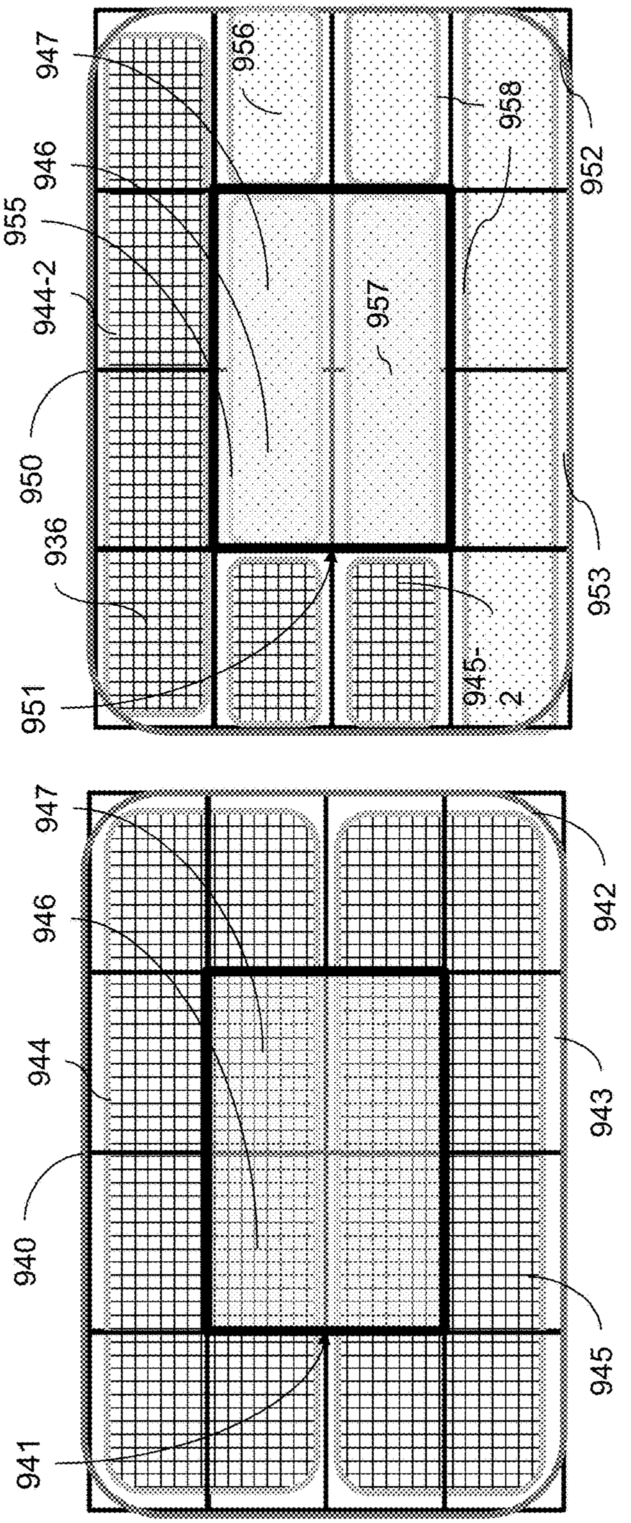

FIG. 9 provides different partitioning of the pictures forming the video sequence. FIG. 9*a* illustrates the original video bitstream configuration before encapsulation, i.e. as partitioned by a video encoder 1200: each tiled picture 900 of the video contains a region of interest 901, the one or more tiles 903 and region of interest being inside one slice 902. It is to be noted that the picture 900 could also contain more than one slice. The one or more slice 902 can be organized into a single slice segment or contain multiple slice segments (with at least one independent segment as the first slice segment). Another part of FIG. 9*a*, picture 910, illustrates a partition resulting from the invention: the picture 910 still contains a region of interest 911 and one slice 912 that now is organized as one independent slice segment per tile (independent slice segment in 915). This is not represented on FIG. 9*a* but it is possible to create a new slice segment grouping the 2 first tiles of the region of interest 911 in a single new slice segment, as well for the 2 bottom tiles of the region of interest 911. This depends on the configuration of the granularity control in the mp4 writer 1213: it may be configured to provide tile-based access or region-of-interest based access (it then tries to group as much as possible the tiles inside a region of interest in a single new slice segment). One advantage of changing the partition into one tile per new independent slice segment is that each tile will be self-contained since the full slice header will be present. This is not the case for following alternative embodiments, but this can be solved by describing the NAL unit to tile mapping as discussed according the FIG. 11. FIG. 9*b* illustrates another partition resulting from the invention: the picture 920 contains the region of interest 921, one slice 922 that is organized into one first ISS 925 and several DSS 926. As for previous example, the consecutive tiles in the region of interest 921 can be grouped in a single new slice segment depending on the granularity control offered by the mp4 writer 1213. Another part of FIG. 9*b*, the picture 930, also illustrates another embodiment where the first tile is enclosed inside one small ISS 935 plus one DSS 936, this in order to reduce the information shared among the tile tracks as discussed according to FIG. 11. Indeed, each dependent slice segment in one slice like 932 requires header information from the independent slice segment beginning the slice. Building a minimal independent segment will limit the amount of data a client will have to download and process or for a bitstream extractor the amount of data to process and save for the extracted file, thus reducing its size. Typically, the new slice segment 935 will contain only the first Coding Unit of the tile, the remaining Coding Units being put in one or more new slice segments 936. As for each new created slice segment in 809, the end of the slice segment has to be properly handled in 813. The other tiles are each enclosed in a DSS like 937. FIG. 9*c* illustrates another use case of the invention where an initial slice 942 already contains slice segments 944 and 945 each containing multiple tiles. In case finer access to tile is required than the slice segment granularity, for example on tiles 946 and 947, the encapsulation can consider this to create a new partitioning according to steps of FIG. 8. A resulting new partitioning is provided on FIG. 9*c*, picture 950 where the original first slice segment 944 is shortened (944-2) and a new slice segment 955 is created to contain the 2 tiles 946 and 947 (of interest) in their own slice segment. This new one can be independent, dependent or re-using the partitioning of the first slice segment 944 as in picture 930 where this first slice segment is split in two slice segments: one shortest ISS 935 plus one DSS 936. Another new slice segment 956 is created for the remaining tile. The same can be applied to the second original slice segment 945 leading to modified or new slice segments: 945-2, 957 and 958 (containing the last 5 tiles). In this change of partition according to the invention, it can be seen that the tiles that are not of interest (example: the set of tiles before the region of interest 951 and the set of tiles after the region of interest 951, in lexicographical order) can be gathered into bigger slice segments, since tile-access is not considered important for these ones. This will avoid multiplication of tracks of group of samples or of NAL units at the system level in the resulting ISOBMFF file or segments. This can be one parameter for control of the granularity in the mp4 writer 1213: tile-based encapsulation, ROI-based encapsulation, useless-tile gathering. The latter in particular can benefit from the "hidden" parameter in another tile descriptor 701 described in reference to FIG. 7. The new portioning can also be user-controlled through command line arguments or graphical user interface: the steps of FIG. 8 can be realized in two steps: a first step to analyze the input video bitstream (steps 800-805) and a second step to actually change the partition following steps 807 to 814. Between these two steps the mp4 writer 1213 can display to the user the current partition of the video bitstream and the user can specify through numerical list of position or graphically modifying the partition the new partitioning that the mp4 writer 1213 should apply. The second step can also be conditioned by results from video analytics module run over the video bitstream. For example, in video surveillance application, if a region of interest or face of a person is considered of interest, this can be notified to the mp4 writer 1213 so that as much as possible the new partition fits the outputs of the video analytics module.

Figure 11A:
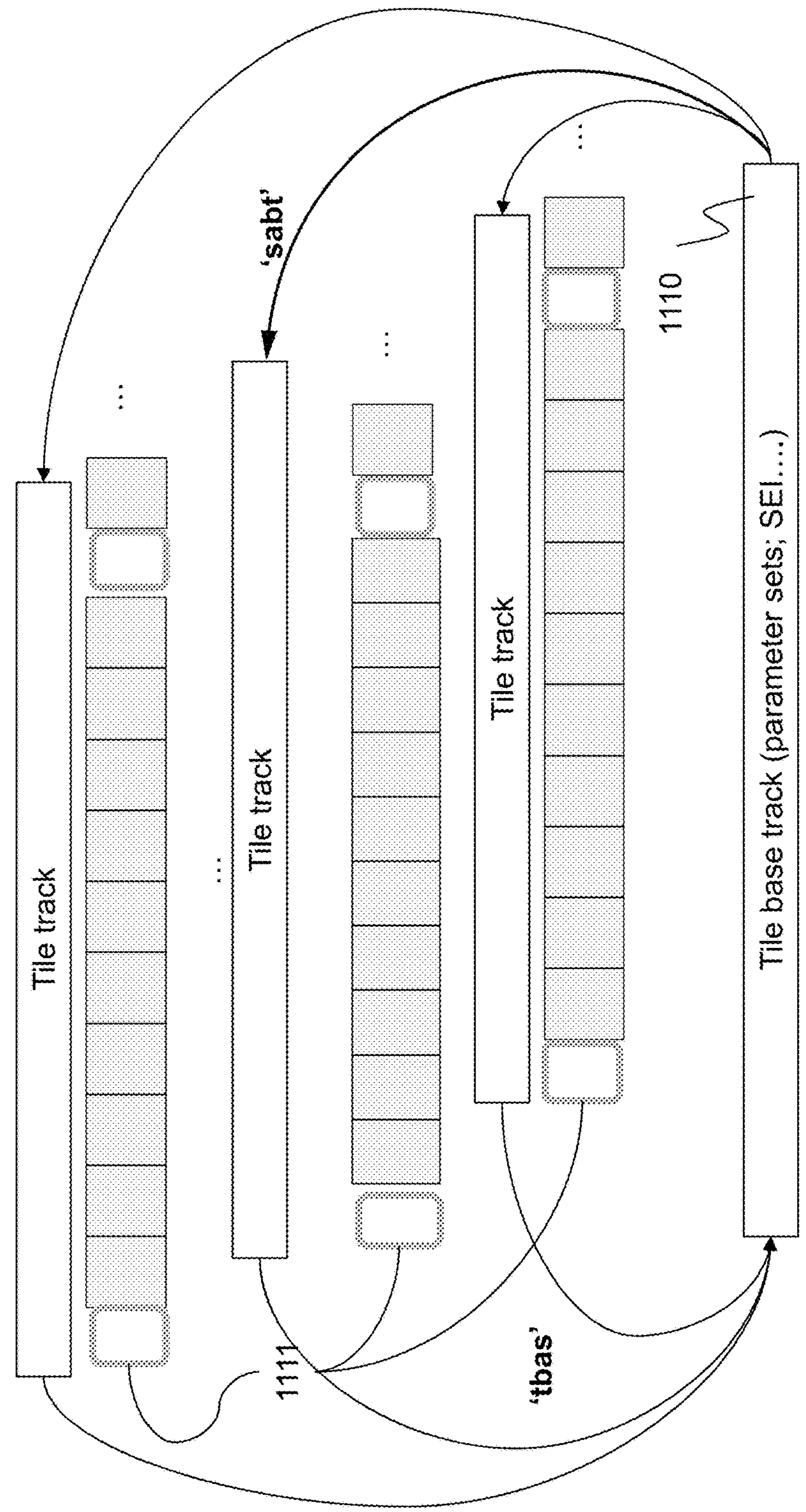
FIGS. 11*a*, 11*b* and 11*c*, illustrates different tile description in encapsulated ISOBMFF file or segments.
Figure 11B:
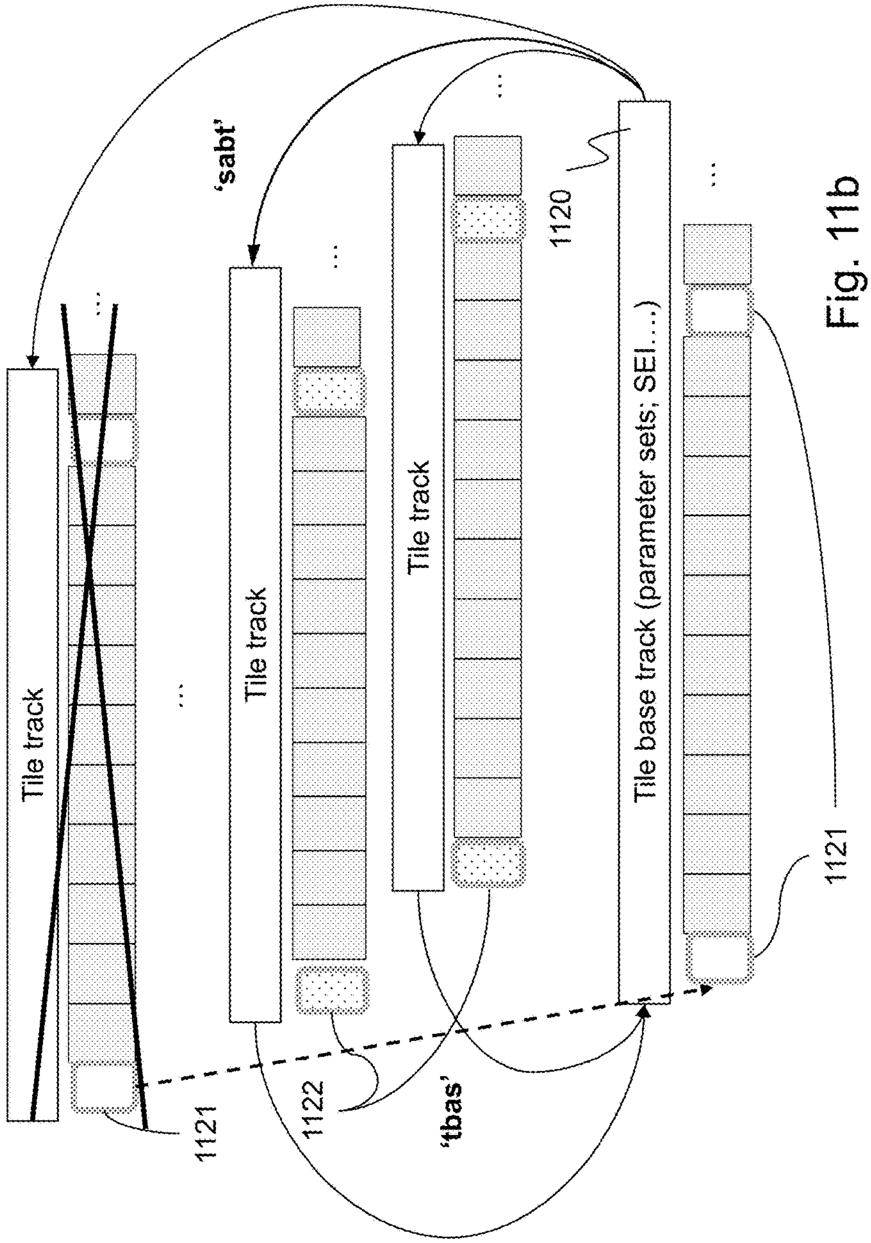
Figure 11C:
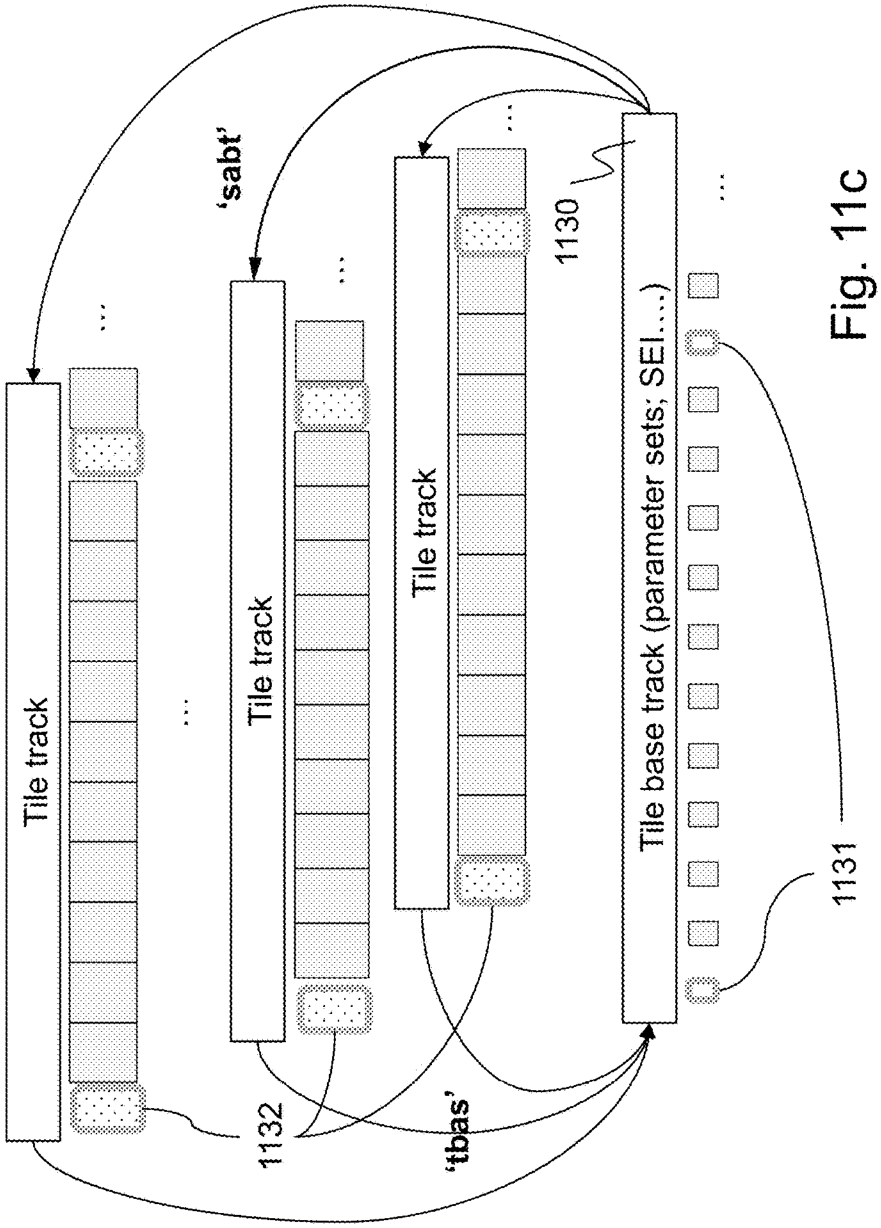

FIG. 11, containing FIGS. 11*a*, 11*b* and 11*c*, illustrates different tile description in encapsulated ISOBMFF file or segments. Two main encapsulation modes should be distinguished depending on whether all the tiles are in one track or whether tile or rectangular region of interest is in its own track. In the former case, a NALUMapEntry is used to map the new created NAL units to a tile descriptor, a trif descriptor for example, potentially accompanied by a tsif if the tile has some coding dependencies (declared in the HEVC temporal motion-constrained tile sets SEI message). This first encapsulation mode can be useful for bitstream extraction and local file manipulation. As preferred embodiment, we describe the second encapsulation mode where the tile or rectangular region of interest is described as a single track. This is because this mode enables tile-based streaming. As such, FIG. 11 only illustrates this second mode.

FIG. 11*a* illustrates a tile or rectangular region based encapsulation with the tile or rectangular region of interest in its own track. This set of tracks correspond to the encapsulation of the partition obtained for picture 910 on FIG. 9*a*. It is assumed an encapsulation with implicit reconstruction of the tracks (i.e. no extractors in the tile base track, but 'sabt' reference to reconstruct the tiles in order when needed). Since each tile or rectangular region of interest is contained in one independent slice segment, each sample of the tile tracks contain the slice header for the independent slice segment header 1111 followed by slice segment data and can be correctly decoded after getting the parameter sets, following the 'tbas' track reference, from the tile base track 1110. It is possible to encapsulate in the same way with a tile base track having extractors to the tile tracks: the dependencies 'sabt' are then replaced with 'scal'. In this case, the tile base track is also a composite track or an aggregation track (i.e. this is an entry point in the file to reconstruct and display one, any combination or all the tile tracks it references through its extractors).

FIG. 11*b* illustrates another embodiment of tile tracks reflecting the partition obtained on picture 920 where the new created slice segments in 810 are one ISS 925 followed by one or more DSS like 926. In such case, the tile track corresponding to first tile in the independent slice segment 925 contains the full slice header 1121 and the slice segment data (in gray). One option is to encapsulate this independent slice segment in this first tile track. But since the other tile tracks corresponding to dependent slice segments like 926 only contain the compact slice header 1122 with their slice data (in gray), information is missing to correctly decode and display these tracks. One encapsulation solving this issue is proposed on FIG. 11*b* where the tile base track 1120 contains, in addition to parameter sets and SEI messages information, the independent slice segment (header 1121+ data), instead of being in the first tile track, is placed in the tile base track as illustrated. As for previous example of FIG. 11*a*, the tile base track can use implicit or explicit reconstruction, respectively using 'sabt' or 'scal' track reference types, with extractors in the latter case. When using extractors, the tile base track is also a composite track or an aggregation track. An alternative embodiment, not represented on FIG. 11 is to have tile tracks for dependent slice segments referencing the first tile track as a tile base track, the first tile track itself referencing the tile base track with 'tbas'. This can be done with recursive extractors to obtain the parameter sets from the tile tracks for dependent slice segments.

FIG. 11*c* is a variation of FIG. 11*b* where instead of sharing the whole independent slice segment corresponding to first tile, only the compact ISS (935 on FIG. 9*b*) is placed in the tile base track while the remaining data for the first tile (the dependent slice segment 936 on FIG. 9*b*) is placed in the corresponding tile track. This reduces the amount of data to transfer and process for the tile tracks encapsulating the dependent slice segments obtained in picture 930. As for other embodiments, both implicit and explicit reconstruction can be used. At the end, each track encapsulated according to one embodiment of FIG. 11.

Following the encapsulation of the new created NAL units in 814, each tile track is described with a tile descriptor that provides tile position, size and decoding independence information. A unique identifier for the tile is created and stored in this tile descriptor (for example the groupID of 'trif'). In such tracks, all samples can be mapped to the tile descriptor with default sample grouping mechanism. In case slice data for the first tile is shared among tile tracks, these data can be flagged as "discardable" (or not displayable) using for example the 'subs' box. The header data can be kept relevant while byte ranges for slice_segment_data (i.e. sub-samples in ISOBMFF) are marked as discardable. This can avoid processing of useless data by the video decoder. Another signaling that can be useful for the rendering of the media is to indicate at system level a cropping instruction to apply on the reconstructed samples, for example using the 'clap' box in the sample description so that for a tile track encapsulating a dependent slice segment, only the useful part is displayed. This can be signaled by modifying cropping window offset parameters in the SPS as an optional last step before outputting the ISOBMFF file or segments in the process described according to FIG. 8. For this operation (adapting the cropping window) to be performed at receiver side, the mp4 writer 1213 can use a new sample entry for these tile tracks with dependency on an independent slice segment contained in another track. This gives an indication to a mp4 reader 1252 or ISOBMFF parser that, for example 'clap' information should be checked and reflected into the SPS (Sequence Parameter Set) of the extracted bitstream. This can also be done at receiver side, dynamically, once the user has selected its tile or rectangular region of interest: only selected one or more tracks need to be inspected in terms of cropping information for relevant cropping window setting. Placing the cropping information at both system (use of 'clap') and video bitstream level (the SPS) increase the interoperability.

FIG. 5 provides the structure and features of a unified tile descriptor, as a different embodiment for tile descriptor. This one, instead of using the two tile descriptors trif and tsif from w15640, gathers in a single descriptor all the tile or group of tiles (or tile set) information. It is a specific VisualSampleGroupEntry and is intended to be described as a property in the SampleGroupDescriptionBox of grouping_type 'trif', associated or not to a SampleToGroupBox with the same grouping_type. The various parameters contained in this unified tile descriptor are described below.

groupID is a unique identifier for the tile region (either a rectangular region in an image or non-rectangular region but without holes) described by this group. Value 0 is reserved for special use in the 'nalm' box.

independent_idc specifies the coding dependencies between this tile region and other tile regions in the current picture and in reference pictures, whether from the same layer or not. This flag takes the following values:

If independent_idc equals 0, the coding dependencies between this tile region and other tile regions in the same picture or previous pictures are given by the list of dependencyTileGroupID. If dependency_tile_count is 0, these dependencies are unknown.

If independent_idc equals 1, there are no temporal dependencies between this tile region and the other tile regions with different groupID in any reference pictures in the same layer but there can be coding dependencies between this tile and the tile region with the same groupID in the reference pictures in the same layer, or with different groupID in other layers. If the associated sample this tile belongs to is a random access sample as defined for this HEVC layer, the coding dependencies between this tile region and other tile regions in lower layers are given by the list of irap_dependencyTileGroupID; if irap_dependency_tile_count is 0, these dependencies are unknown. If the associated sample this tile belongs to is not a random access sample as defined for this HEVC layer, the coding dependencies between this tile region and other tile regions in lower layers are given by the list of dependencyTileGroupID; if dependency_tile_count is 0, there are no coding dependencies between this tile region and other tile regions in any reference picture of other layers for non random access samples.

If independent_idc equals 2, there are no coding dependencies between this tile region and any other tiles in the reference pictures.

Value 3 is reserved.

full picture, when set, indicates that this tile region is actually a complete picture, in which case region_width and region_height shall be set to the layer luma size, and independent_flag shall be set to 1. This allows expressing dependencies between tiles of a layer to a non-tiled layer, the later using a 'trif' sample group with full_picture parameter set to 1. When tile_group is set to 1 and full_picture is set to 1, the union of tile regions identified by tileGroupID list shall completely cover (no holes, no overlap) the layer luma plane.

filtering_disable, when set, indicates that no post-decoding filtering operation on this tile region require access to pixels adjacent to this tile region, i.e. bit-exact reconstruction of the tile region is possible without decoding the adjacent tiles.

tile_group, when set to 1, indicates that this tile region is the result of visually grouping the tile regions identified by tileGroupID. This allows describing non rectangular tile regions. When set to 0, the tile region shall be used to describe a rectangular, dense rectangle (i.e. without holes) of HEVC tiles.

has_dependency_list: when set to 1, indicates that a list of dependencies is present. If set to 0, dependency_tile_count is assumed to be 0.

has_irap_dependency_list: when set to 1, indicates that a list of dependencies for random access samples is present. If set to 0, irap_dependency_tile_count is assumed to be 0.

horizontal offset and vertical offset give respectively the horizontal and vertical offsets of the top-left pixel of the rectangular region represented by the tile region, relative to the top-left pixel of the picture, in luma samples of the base region. When tile_group is set to 1, these values are inferred to be the minimum values of horizontal_offset, vertical_offset of the tiles regions identified by tileGroupID.

region_width and region_height give respectively the width and height of the rectangular region represented by the tile region, in luma samples of the base region. When tile_group is set to 1, these values are inferred to be the width and height of the region described by the union of tiles regions identified by tileGroupID.

tile_count gives the number of tiles regions from which this tile region is defined.

tileGroupID indicates the tile region groupID value (as defined by a TileRegionGroupEntry) of a tile region that belongs to this tile region.

dependency_tile_count indicates the number of tile regions in the dependency list.

dependencyTileGroupID gives the identifier of a tile region (as defined by a TileRegionGroupEntry) that this tile region depends on.

irap_dependency_tile_count and irap dependencyTileGroupID specify an additional list of tile region(s) this tile region depends on when the sample this tile region belongs to is a random access sample as defined for this HEVC layer.

For tile tracks as defined in HEVC and L-HEVC standards, the base region used in the TileRegionGroupEntry is the size of the picture to which the tile belongs. Note that for L-HEVC streams using spatial scalability and tiling on both the base and enhancement layers, the TileRegionGroupEntry sample descriptions of the base layer will give coordinates expressed in luma samples of the base layer, while the TileRegionGroupEntry sample descriptions of the enhancement layer will give coordinates expressed in luma samples of the enhancement layer.

The unified tile descriptor reduces the number of sample groups present in SampleTableBox 'stb1' or in track fragments 'traf'. It also simplifies the description of inter-layer dependencies of HEVC tiles since only one descriptor has to be parsed, whatever a single tile or a tile set is described. It also simplifies the encapsulation process for mp4 writer 1213.

As an alternative embodiment and for specific coding configurations, we may change the signification of the groupID to allow it to describe the same tile across different layers. For example, when grid of tiles is aligned across layers (all tiles have the same positions in both layers). This can be the case for two SNR scalability layers for example. This way, a single tile descriptor can be declared in the track, for the two layers, instead of two tile descriptors, one per layer.

Another embodiment consists in reserving another value for the independent_idc flag to indicate that a tile or tile set is independent in its layer but has dependencies in other layers, but only on the same co-located tile or tile set. This could avoid the explicit declaration of the dependencies list, even with multi-layer video.

Another embodiment combining the tile_group flag and the reserved bit so as to form a 2-bit parameter, can consist in signaling in the tile descriptor whether the tile is single tile (00 in binary), a tile set (01) or a tile subset (10), the value (11) being reserved. The new point here is the handling of encoding configuration where one slice contains more than one tile. Using the new 2-bit parameter and when set to 10 (in binary), it also allows to indicate some coding dependencies for tiles inside a slice. This can be useful when one wants to extract for storage or streaming only a tile in the slice.

Another embodiment for the tile descriptor is to have a codec-agnostic part and a codec-specific part. Two alternative examples of the codec-agnostic part are shown on FIG. 6. The first alternative 601 defines the new TileRegion sample group entry, identified by a specific reserved code, for example 'tile'. The TileRegion sample group description is used to describe the spatial relationship between video or image media tracks. It allows identifying that decoded samples of a track spatially correspond to a given rectangular area in another track. It contains the following parameters:

region_id is a unique identifier for all tile region sample group descriptions that relate to the same visual region.

horizontal_offset and vertical_offset give respectively the horizontal and vertical offsets of the top-left coordinate of the rectangular region represented by the rectangular tile region, relative to the top-left coordinate of the reference region. The reference region is the region formed by the union of all sample group description of type 'tile' with the same region_id.

region_width and region_height give respectively the width and height of the rectangular region represented by the rectangular tile region, in integer coordinates.

The units used to describe the region size are arbitrary units and may correspond to video pixel resolution, but don't have to.

This new TileRegion sample group description is used to describe the spatial relationship between video or image media tracks. It allows identifying that decoded samples of a track spatially correspond to a given rectangular area in another track. This can be useful for media files or live media streams encapsulating multiple video tracks. For example a TV program where several views are proposed, this can be used, depending on the current camera arrangement in displays (position of these different videos, for example picture in picture or video in video) to know where a specific content associate to one of the video tracks is located. This can be useful for example if video gadgets have to be superimposed or if subtitles have to be associated to the video. In general, a video track "A" may use a track reference of type "tile" to a video track "B" in order to indicate that the content of "A" is a rectangular region of the content of "B". The description of the location of this area is given by TileGroupEntry sample group descriptions like in 401.

The other alternative 602 contains the following parameters:

full_picture parameter (for example on one bit) that when set to 1, indicates that this rectangular tile region is actually a complete picture, in which case region_width and region_height shall be set to the width and height of the reference region. Semantics for this field may be further restricted by derived specifications, like for example codec specific file formats.

The template parameter is reserved but can be overridden by other specifications like for example codec specific file formats.

groupID is a unique identifier for all tile region sample group descriptions that relate to the same visual region. Value 0 is reserved for special use by derived specifications. Derived specification may override the semantics of this field.

horizontal_offset and vertical_offset give respectively the horizontal and vertical offsets of the top-left pixel of the rectangular region represented by the rectangular tile region, relative to the top-left pixel of the reference region. For the context of this specification, the reference region is the region formed by the union of all sample group description of type 'trif' with the same groupID. Semantics for this field may be further restricted by derived specifications like for example codec-specific file formats.

region_width and region_height give respectively the width and height of the rectangular region represented by the rectangular tile region, in luma samples.

Alternative embodiments exist for these two variants, in particular adding place holders (or reserved bits) at the end to provide codec-specific information, like for example the dependency information (independent_idc) flag of the unified tile descriptor or the various dependency lists.

Figure 7:
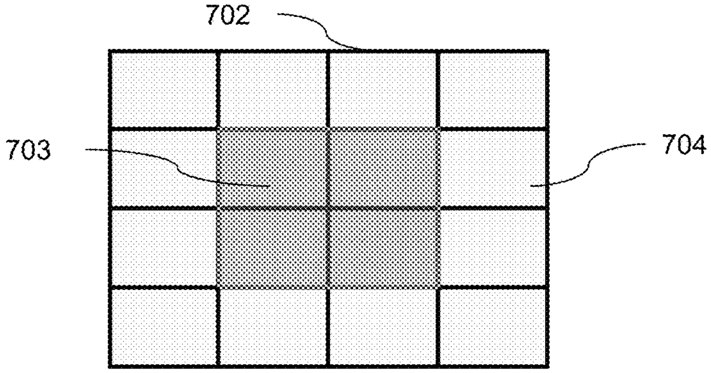
FIG. 7 illustrates a variant of the unified tile descriptor.

FIG. 7 illustrates another embodiment for the unified tile descriptor 701 to address specific tile-based use case. In particular, it allows to address video sample organization as on 702 where each tiled video sample has a region of interest 703 and other tiles corresponding to background of the video (704). The new hidden flag proposed in the tile descriptor 701 allows to encapsulate less important tiles, here the background ones in a dummy or virtual tile descriptor. Typically, the tile descriptor for the region of interest contains the sizes of the region 703 and its positions in the video 702. But for background tiles, it is more efficient to define one rectangular region and mark it as hidden or not intended to be displayed, setting this hidden flag to 1. This informs a parser that position and size information is not reliable and not intended to be used. As such, instead of defining one or more rectangular regions with multiple unified tile descriptors, only one dummy tile descriptor is sufficient. Moreover, it allows to describe any arbitrarily shaped region in the image, even with holes. This is useful for bit-stream extraction when a player needs to extract only the region of interest. Since bit-stream extraction is a subtraction process, the mp4 parser like in 1252 or multimedia player needs to rapidly identify the track or the sample or the NAL units (resp. when tiles are in tile track, mapped through samples groups and mapped via NALU mapping) to discard so as to obtain the region of interest. Identifying a dummy tile descriptor, it would get the information that related track or samples or NAL units can be safely discarded from the bit-stream. An alternative to the use of this specific flag or parameter can be to indicate that when sizes are set to 0, then it is a dummy tile descriptor and then a region not intended to be displayed. An additional parameter can also be added to the unified tile descriptor to annotate the region, using for example an additional string parameter (not represented on FIG. 7). This additional string parameter can take: "ROI", "background" text description. Another advantage of dummy tile descriptor is that when content creator prepares a media presentation for streaming, the DASH packager in charge of transforming the ISOBMFF file into streamable DASH segments has the indication that, for example a tile track is a dummy one (as described for the set of tiles in picture 950 on FIG. 9*c*) and this one would automatically not be exposed at DASH level.

It has to be noted that the tile_group parameter of the unified tile descriptor can be used to control the access granularity in terms of tiles. For example, one can decide to encapsulate video samples as on 702 into a first tile describing the region of interest 703 as a single rectangular region (thus not providing a finer access than the region: no access to each tile composing this region of interest is provided). This, when tile tracks are exposed in streaming manifest for tile-based transmission or adaptation can save description size in the streaming manifest and makes adaptation easier for DASH clients (less choices and configuration to compare and select).

To make easier the tile-based streaming, the tile tracks from the ISOBMFF file or segment files encapsulated according to the invention have to be exposed in a streaming manifest or playlist. In a preferred embodiment, we consider the MPEG DASH protocol for adaptive streaming on HTTP.

When constraining the HEVC parameter sets to be identical among different versions of the stream, it is possible to combine the tiles from these versions into a conformant HEVC bit-stream, decodable using a single decoder, thereby opening the possibilities to adapt the bitrate on a tile-basis, rather than on a complete sequence level, as shown on FIG. 8 (in 820). FIG. 8 illustrates some usages of tile tracks for tile-based rendering: tile-based adaptation 820, tile-based view 825 or tile-based transcoding and rendering as a full-picture 830. Each tile of each quality can typically be packaged in a single track containing only tile-related Video Coding Layer NAL units, and most non Video Coding Layer (non-VCL) NAL units would be in a dedicated track, called "base tile track".

In such case, reconstruction of the full Access Unit (AU) can be achieved based either on extractors from the base tile track to tile tracks, or on implicit AU reconstruction rules (mostly VCL NALU concatenation rules) from the base track to tile tracks.

It is to be noted that if only a subset of the complete tiles of an HEVC sequence should be decoded then un-needed tile tracks can be discarded and/or some extractors can be ignored while decoding the HEVC sequence; this would however not rebuild a complete image as shown in FIG. 8 on 825 part where only one of the two tiles is selected (black area on the right of 825 for which no data is received).

The HEVC file format also defines an extractor format giving rules to rewrite part of the bit-stream while copying other parts. A typical use case for this is to provide an extractor track that extracts a tile of a N×M motion-constrained tiled HEVC bit-stream into a conformant, non-tiled HEVC bit-stream with the same resolution as the extracted tile, allowing full-frame playback of a single tile without having to strip part of the reconstructed picture as shown on 830 on FIG. 8. Obviously, accessing only the tile of interest through DASH rather than the entire bit stream would save quite a lot of bandwidth and is interesting for ROI inspection using DASH or any adaptive streaming protocol.

In order to perform tile-based access to the video bit-stream, the base tile track 810 and the tile tracks 811 to 814 are each mapped to an MPEG-DASH Representation in its own AdaptationSet, where the tile location is given by an SRD descriptor at the AdaptationSet level. Each tile track Representation then has a dependencyId attribute towards the "base tile track", allowing locating and loading all non-VCL data for that track. Two approaches are then possible in order to reconstruct the complete video from all the tile tracks, as illustrated on FIG. 8 and described in the tables of the Appendix.

In the first approach, corresponding to 820 rendering and Table 1, all tile tracks 811 to 814 Representations and the base tile track 810 Representation share the same initialization segment (same physical file on media server called "v_base.mp4"), repeated in streaming manifest with each tile track Representation and with the base tile track. The base tile tracks 811 to 814 are described as Representations with the codecs attribute set to 'hvt1' followed by profile/tier/level information. The DASH client is responsible for fetching in order the different tiles of interest (from the corresponding AdaptationSets and/or Representations of the DASH MPD), for example selected by a user from a user interface. The user interface can for example reflect the SRD information obtained by DASH client during MPD parsing and can display the grid of tiles somewhere on the user interface. Each cell of the grid of tiles can be clickable to select one or a set of tiles. Each cell in the grid of tiles is then related to an AdaptationSet declared in the manifest. The DASH client then knows that clicking a cell or a selection of cells means selection of the one or more related AdaptationSets. This simplifies the design of the MPD, but however requires special processing at the DASH client to identify that all tiled Representations (Representation for tile tracks) belong to the same coded object, by analyzing dependency indications (for example the dependencyId attribute in DASH), mime type and SRD parameters. The so-selected tile tracks (through the AdaptationSets or Representations for example) are rendered as they are placed in the original file: i.e. the reconstructed video bit-stream for a selected tile is rendered in its position given in the SRD and from the position in the original video sequence as shown in 820. When selecting multiple tiles to be played together, then the initialization segment may be requested twice. But the HTTP stack of the DASH client will already have this segment in its cache and the request would then not be issued again. It is to be noted that the Representation for the base tile track 810 in the Table 1 has specific SRD annotation with object width and object_height set to 0. This is an indication that should prevent DASH clients to select this base tile track alone. Indeed, it is declared in the manifest so that tile tracks depending on it can obtain initialization information. The trick in the description of Table 1 is that the initialization segment is declared in each Representation of the tile tracks but in terms of encapsulation it is placed in the base tile track. In this scenario, the DASH client needs to identify that all adaptation sets with Representation containing tracks of type "hvt1" and the same SRD source_id are a single video object, and should not instantiate multiple video decoders. This differs from "regular" logic in DASH (with or without SRD) where each AdaptationSet maps to a single decoder, but is actually very close to multi-view use cases (each view in a given adaptation set) or a spatial scalable use case where UHD enhancement and HD base layer would be in separate adaptation set.

In the second approach, represented in Table 2 in the appendix, each tile track Representation (or the base tile track 810 Representation) has its own initialization segment, typically including only the tile track and the base tile track (signaled with SRD object_width and object_height set to 0 to avoid selection by a DASH client). This description complies with the DASH rule on different initialization segments for dependent Representations. In addition to the AdaptationSets for tile and base tile tracks, an extra "aggregation" AdaptationSet (for example using extractors as in composite track) is used to describe the set of tile tracks composing the full video for each quality; the Representations in this set would have their own initialization segment including all tile tracks, and dependencyId to all tile tracks Representation; the media segments of this Representation will be empty, as all data is carried in the base track and the tile tracks. This design is a bit heavier but does not require specific processing of the DASH client in order to reconstruct the full video. However, this design does not allow expressing adaptation rules of the tile tracks Representation, as the aggregated Representation (the ones with codecs="hev2 . . . " on Table 2) explicitly gives the list of dependencies that have to be followed by the DASH engine. In this case, the selected tile track is rendered as a new compliant HEVC bit-stream resulting from high-level syntax modification (for example by transcoding video sizes and rewriting the position of the coding tree blocks for the tile) to render the tile or a set of tile as a new full video as shown in 830.

The condition on different initialization segments for the Representations in Table 2 comes from the DASH specification on handling of initialization segments in case of dependent Representations. However, since the base track cannot be used without the tile tracks, and a single tile track with its base being an incomplete HEVC bit-stream, enforcing different initialization segments is relevant in the tiling case. This design does not allow expressing adaptation rules of the tile tracks representation, as each aggregated representation explicitly gives the list of dependencies that have to be followed by the DASH engine. One approach to fix this problem is to declare in the manifest all the possible tile combinations in the "aggregated" AdaptationSet, but this becomes heavy when using 3×3 or more tiling. For example, a two alternative bitrates for a 3×3 tiling would lead to 512 combinations.

Table 3 is another example of a DASH description of tile tracks containing the proposed tile descriptor. In order to perform full HEVC reconstruction from a tile without accessing the entire tiled bit-stream, each tile of the video stream can be packaged in a single track of type hvt1, and extraction instruction would be in an additional track of type hev2/hvc2 (since the resulting extracted bit-stream is a conformant HEVC bit-stream). Both tracks can be packaged in a single media file (for example ISOBMFF file).

Table 4 is another example, reusing description of table 3 and adding an AdaptationSet for the full video that described a 2×1 tiling as on 800 on FIG. 8.

A preferred embodiment is illustrated in Table 5. This description of HEVC tile tracks embedding the proposed tile descriptor for tile-based adaptation keeps the MPD light. For that, the Adaptation Sets containing representations of codec type 'hvt1' shall only contain representation of type 'hvt1'. The Adaptation Sets containing Representations having a codecs (the "codecs" attribute in Table 5) type 'hvt1' shall contain an SRD descriptor as SupplementalProperty. These SRD parameters reflect the parameters stored in the tile descriptor 'trif' of the tile track. The base tile track of an 'hvt1' Representation (Representation with @codecs='hvt1 . . . ') is given by the last entry in the dependencyId list that indicates a Representation with codec type hev2/hvc2. All 'hvt1' representations sharing the same base have identical switching and addressing properties as their base tile track: initialization segment, bitstreamSwitching, startWithSAP, segment duration or SegmentTimeline, startNumber, $Time$ or $Number$ addressing. The "base tile track" is declared in a dedicated AdaptationSet containing an essential property SRD descriptor, with object_x, object_y, object_width, object_height all being set to 0. Alternatively to these specific 0 values for SRD, an AdaptationSet not intended to be displayed (for example a tile track whose tile descriptor has the "hidden" flag set to 1) can be signaled with a specific SRD schemeldUri or with new Role value. For example: <Role schemeldUri="urn:mpeg:dash:role:2011" value="hidden"/> (or "private" instead of "hidden, or any reserved value to indicate that it is not intended for selection) or <SupplementalProperty schemeldUri=urn:mpeg:dash:srd:hidden". Another way of indicating this is to use empty AdaptationSet signaling. Several tile representations, as indicated by the 'hvt1' codec type in the MPD, can be gathered in a single AdaptationSet if and only if they have the same dependencyId and correspond to the same tile, as indicated by the SRD descriptor in the AdaptationSet. Adaptation Sets containing representations of codec type 'hvt1' can then be decoded using a single HEVC decoder if and only if provided that they share the same base tile track, as identified by their dependencyId and that they belong to the same SRD group, as identified by the source_id of the SRD descriptor. This description and organization of the streaming manifest avoids defining one "aggregation" AdaptationSet per tile and allows mixing tiles at different qualities and/or ROI inspection use cases.

In the Table 5 example, each tile track is accessible as a single conformant HEVC video through the Representations N_K_x, (N being the tile number and K the quality level) while at the same time the complete video can be recomputed by feeding all selected 'hvt1' representations to the HEVC decoder associated with SRD sharing the same source_id value. (1 in the example of Table 5).

An alternative embodiment, instead of relying on 'hvt1' codec conditions is to define a new DASH descriptor, for example an EssentialProperty with schemeldUri equal to "urn:mpeg:dash:video:tile:2016" for the AdaptationSet containing tile representations (or in the Representation itself) and another descriptor, for example with "urn:mpeg:dash:video:basetile:2016" schemeldUri value for the "base tile track" (the new descriptor is placed in the Representation or the AdaptationSet) describing this base tile track. This makes the manifest less HEVC_centric (i.e. extensible to other video compression formats) since no more relying on the specific sample entry 'hvt1'. This follows the generalization of the tile descriptor as a generic tile descriptor independent from the coding or compression format.

Figure 10:
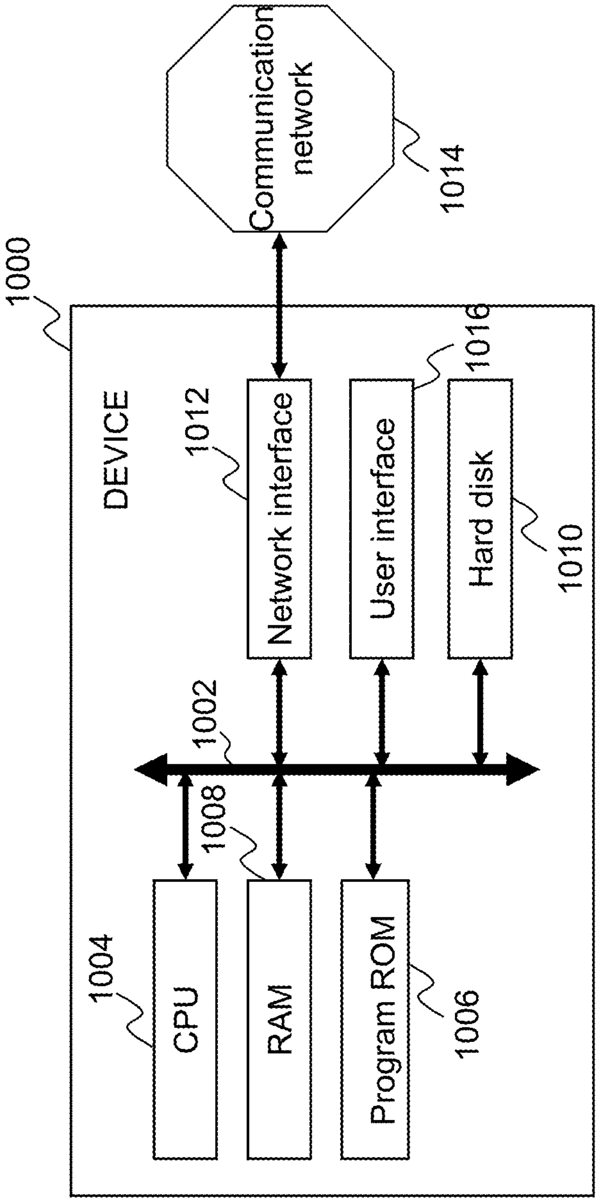
FIG. 10 represents a block diagram of a server or a client device in which steps of one or more embodiments may be implemented.

FIG. 10 represents a block diagram of a server or a client device 1000 in which steps of one or more embodiments may be implemented.

Preferably, the device 1000 comprises a communication bus 1002, a central processing unit (CPU) 1004 capable of executing instructions from program ROM 1006 on powering up of the device, and instructions relating to a software application from main memory 1008 after the powering up. The main memory 1008 is for example of Random Access Memory (RAM) type which functions as a working area of CPU 1004 via the communication bus 1002, and the memory capacity thereof can be expanded by an optional RAM connected to an expansion port (not illustrated). Instructions relating to the software application may be loaded to the main memory 1008 from a hard disk (HD) 1010 or the program ROM 1006 for example. Such software application, when executed by the CPU 1004, causes the encapsulation step described with reference to FIGS. 8 and 13 to be performed in the server.

Reference numeral 1012 is a network interface that allows the connection of the device 1000 to the communication network 1014. The software application when executed by the CPU 1004 is adapted to react to requests received through the network interface and to provide data streams and requests via the network to other devices.

Reference numeral 1016 represents user interfaces to display information to, and/or receive inputs from, a user.

It should be pointed out here that, as a variant, the device 1000 for managing the reception or sending of multimedia bit-streams can consist of one or more dedicated integrated circuits (ASIC) that are capable of implementing the method as described with reference to FIG. 9. These integrated circuits are for example and non-restrictively, integrated into an apparatus for generating or displaying video sequences and/or for listening to audio sequences.

Embodiments of the invention may be embedded in a device such as a camera, a smartphone, or a tablet that acts as a remote controller for a TV, for example to zoom into a particular region of interest. They can also be used from the same devices to have personalized browsing experience of a TV program by selecting specific areas of interest. Another usage of these devices by a user is to share selected sub-parts of his/her preferred videos with other connected devices. They can also be used in smartphone or tablet to monitor what happens in a specific area of a building placed under surveillance provided that the surveillance camera supports the generation part of this invention.

Naturally, in order to satisfy local and specific requirements, a person skilled in the art may apply to the solution described above many modifications and alterations all of which, however, are included within the scope of protection of the invention as defined by the following claims.

APPENDIX

TABLE 1

```
<MPD>
  <Period >
    <AdaptationSet maxWidth="1280" maxHeight="640" >
      <EssentialProperty schemeIdUri="urn:mpeg:dash:srd:2014" value="1, 0, 0, 0, 0"/>
        <SegmentTemplate initialization="v_base.mp4" ... />
          <Representation id="1" mimeType="video/mp4" codecs="hev2.1.6.L186.0" width="1280"
height="640" />
    </AdaptationSet>
    <AdaptationSet maxWidth="640" maxHeight="640" ...>
      <SupplementalProperty schemeIdUri="urn:mpeg:dash:srd:2014" value="1, 0, 0, 640, 640"/>
      <SegmentTemplate initialization="v_base.mp4" ... />
      <Representation id="1_1" mimeType="video/mp4" codecs="hvt1.1.6.L186.0" dependencyId="1"
bandwidth="128000"/>
      <Representation id="1_2" mimeType="video/mp4" codecs="hvt1.1.6.L186.0" dependencyId="1"
bandwidth="768000"/>
    </AdaptationSet>
    <AdaptationSet maxWidth="640" maxHeight="640" ...>
      <SupplementalProperty schemeIdUri="urn:mpeg:dash:srd:2014" value="1, 640, 0, 640, 640"/>
      <SegmentTemplate initialization="v_base.mp4" ... />
      <Representation id="2_1" mimeType="video/mp4" codecs="hvt1.1.6.L186.0" dependencyId="1"
bandwidth="128000"/>
      <Representation id="2_2" mimeType="video/mp4" codecs="hvt1.1.6.L186.0" dependencyId="1"
bandwidth="768000"/>
    </AdaptationSet>
  </Period>
</MPD>
```

TABLE 2

```
<MPD>
<Period >
    <AdaptationSet maxWidth="1280" maxHeight="640" >
      <EssentialProperty schemeIdUri="urn:mpeg:dash:srd:2014" value="1,0,0,0,0"/>
      <SegmentTemplate initialization="v_base.mp4" ... />
      <Representation id="1" mimeType="video/mp4" codecs="hev2.1.6.L186.0" width="1280" height="640"/>
    </AdaptationSet>
    <AdaptationSet ...>
      <SupplementalProperty schemeIdUri="urn:mpeg:dash:srd:2014" value="1,0,0,640,640"/>
      <SegmentTemplate initialization="v_tile1.mp4" ... />
      <Representation id="1_1" mimeType="video/mp4" codecs="hvt1.1.6.L186.0" dependencyId="1"
bandwidth="128000"/>
      <Representation id="1_2" mimeType="video/mp4" codecs="hvt1.1.61186.0" dependencyId="1"
bandwidth="768000"/>
    </AdaptationSet>
    <AdaptationSet ...>
      <SupplementalProperty schemeIdUri="urn:mpeg:dash:srd:2014" value="1,640,0,640,640"/>
      <SegmentTemplate initialization="v_tile2.mp4" ... />
      <Representation id="2_1" mimeType="video/mp4" codecs="hvt1.1.6.L186.0" dependencyId="1"
bandwidth="128000"/>
      <Representation id="2_2" mimeType="video/mp4" codecs="hvt1.1.6.L186.0" dependencyId="1"
bandwidth="768000"/>
    </AdaptationSet>
    <AdaptationSet ...>
      <SupplementalProperty schemeIdUri="urn:mpeg:dash:srd:2014" value="1,0,0,1280,640"/>
      <SegmentTemplate initialization="v_all.mp4" ... />
      <Representation id="A_1" mimeType="video/mp4" codecs="hev2.1.6.L186.0" dependencyId="1_1
2_1"/>
      <Representation id="A_2" mimeType="video/mp4" codecs="hev2.1.6.L186.0" dependencyId="1_1
2_2"/>
      <Representation id="A_1" mimeType="video/mp4" codecs="hev2.1.6.L186.0" dependencyId="1_2
2_1"/>
      <Representation id="A_2" mimeType="video/mp4" codecs="hev2.1.6.L186.0" dependencyId="1_2
2_2"/>
    </AdaptationSet>
  </Period>
</MPD>
```

TABLE 3

```
<MPD>
<Period >
    <AdaptationSet maxWidth="1280" maxHeight="640" >
      <EssentialProperty schemeIdUri="urn:mpeg:dash:srd:2014" value="1,0,0,0,0"/>
      <SegmentTemplate initialization="v_base.mp4" ... />
      <Representation id="1" mimeType="video/mp4" codecs="hev2.1.6.L186.0" width="1280" height="640"/>
    </AdaptationSet>
    <AdaptationSet ...>
      <SupplementalProperty schemeIdUri="urn:mpeg:dash:srd:2014" value="1,0,0,640,640"/>
      <SegmentTemplate initialization="v_tile1_x.mp4" ... />
      <Representation id="1_1" mimeType="video/mp4" codecs="hev2.1.6.LXXX.0" dependencyId="1"/>
      <Representation id="1_2" mimeType="video/mp4" codecs="hev2.1.6.LXXX.0" dependencyId="1"/>
    </AdaptationSet>
    <AdaptationSet ...>
      <SupplementalProperty schemeIdUri="urn:mpeg:dash:srd:2014" value="1,640,0,640,640"/>
      <SegmentTemplate initialization="v_tile2_x.mp4" ... />
      <Representation id="2_1" mimeType="video/mp4" codecs="hev2.1.6.LXXX.0" dependencyId="1"/>
      <Representation id="2_2" mimeType="video/mp4" codecs="hev2.1.6.LXXX.0" dependencyId="1"/>
    </AdaptationSet>
  </Period>
</MPD>
```

TABLE 4

```
<MPD>
<Period >
  <AdaptationSet maxWidth="1280" maxHeight="640" >
    <EssentialProperty schemeIdUri="urn:mpeg:dash:srd:2014" value="1,0,0,0,0"/>
    <SegmentTemplate initialization="v_base.mp4" ... />
    <Representation id="1" mimeType="video/mp4" codecs="hev2.1.6.L186.0" width="1280" height="640"/>
  </AdaptationSet>
  <AdaptationSet ...>
    <SupplementalProperty schemeIdUri="urn:mpeg:dash:srd:2014" value="1,0,0,640,640"/>
    <SegmentTemplate initialization="v_tile1.mp4" ... />
    <Representation id="1_1" mimeType="video/mp4" codecs="hev2.1.6.LXXX.0" dependencyId="1"/>
    <Representation id="1_2" mimeType="video/mp4" codecs="hev2.1.6.LXXX.0" dependencyId="1"/>
  </AdaptationSet>
  <AdaptationSet ...>
    <SupplementalProperty schemeIdUri="urn:mpeg:dash:srd:2014" value="1,640,0,640,640"/>
    <SegmentTemplate initialization="v_tile2.mp4" ... />
    <Representation id="2_1" mimeType="video/mp4" codecs="hev2.1.6.LXXX.0" dependencyId="1"/>
    <Representation id="2_2" mimeType="video/mp4" codecs="hev2.1.6.LXXX.0" dependencyId="1"/>
  </AdaptationSet>
  <AdaptationSet ...>
    <SupplementalProperty schemeIdUri="urn:mpeg:dash:srd:2014" value="1,0,0,1280,640"/>
    <SegmentTemplate initialization="v_all.mp4" ... />
    <Representation mimeType="video/mp4" codecs="hev2.1.6.L186.0" dependencyId="1_1 2_1"/>
    <Representation mimeType="video/mp4" codecs="hev2.1.6.L186.0" dependencyId="1_1 2_2"/>
    <Representation mimeType="video/mp4" codecs="hev2.1.6.L186.0" dependencyId="1_2 2_1"/>
    <Representation mimeType="video/mp4" codecs="hev2.1.6.L186.0" dependencyId="1_2 2_2"/>
  </AdaptationSet> </Period>
</MPD>
```

TABLE 5

```
<MPD>
<Period >
  <AdaptationSet maxWidth="1280" maxHeight="640" >
    <EssentialProperty schemeIdUri="urn:mpeg:dash:srd:2014" value="1,0,0,0,0"/>
    <SegmentTemplate initialization="v_base.mp4" ... />
    <Representation id="1" mimeType="video/mp4" codecs="hev1.1.6.L186.0" width="1280" height="640"/>
  </AdaptationSet>
  <AdaptationSet ...>
    <SupplementalProperty schemeIdUri="urn:mpeg:dash:srd:2014" value="1,0,0,640,640"/>
    <SegmentTemplate initialization="v_base.mp4" ... />
    <Representation id="1_1" mimeType="video/mp4" codecs="hvt1.1.6.L186.0" dependencyId="1"/>
    <Representation id="1_2" mimeType="video/mp4" codecs="hvt1.1.6.L186.0" dependencyId="1"/>
  </AdaptationSet>
  <AdaptationSet ...>
    <SupplementalProperty schemeIdUri="urn:mpeg:dash:srd:2014" value="1,640,0,640,640"/>
    <SegmentTemplate initialization="v_base.mp4" ... />
    <Representation id="2_1" mimeType="video/mp4" codecs="hvt1.1.6.L186.0" dependencyId="1"/>
    <Representation id="2_2" mimeType="video/mp4" codecs="hvt1.1.6.L186.0" dependencyId="1"/>
  </AdaptationSet>
  <AdaptationSet ...>
```

TABLE 5-continued

```
    <SupplementalProperty schemeIdUri="urn:mpeg:dash:srd:2014" value="1,0,0,640,640"/>
    <SegmentTemplate initialization="v_tile1_x.mp4" ... />
    <Representation id="1_1_x" mimeType="video/mp4" codecs="hev2.1.6.LXXX.0" dependencyId="1_1"/>
    <Representation id="1_2_x" mimeType="video/mp4" codecs="hev2.1.6.LXXX.0" dependencyId="1_2"/>
  </AdaptationSet>
  <AdaptationSet ...>
    <SupplementalProperty schemeIdUri="urn:mpeg:dash:srd:2014" value="1,640,0,640,640"/>
    <SegmentTemplate initialization="v_tile2_x.mp4" ... />
    <Representation id="2_1_x" mimeType="video/mp4" codecs="hev2.1.6.LXXX.0" dependencyId="2_1"/>
    <Representation id="2_2_x" mimeType="video/mp4" codecs="hev2.1.6.LXXX.0" dependencyId="2_2"/>
  </AdaptationSet>
</Period>
</MPD>
```

The invention claimed is:

1. A method for encapsulating a video bitstream organized into slice segments, the slice segments comprising a plurality of coding units, the method comprising:

obtaining a region of interest comprising one or more tiles, each tile comprising a set of one or more coding units;

determining whether the region of interest forms part of a slice segment;

if it is determined that the region of interest forms part of a slice segment, defining a new slice segment comprising the coding units of only the region of interest; and encapsulating the bitstream comprising the coding units of the region of interest using the new slice segment if it is determined that the region of interest forms part of a slice segment, and using the slice segment otherwise.

2. The method of claim 1, wherein the encapsulating comprising associating the new slice segment with a descriptor of the region of interest.

3. The method of claim 2, wherein the associating is performed according to one of the following:

associating is done with sample group mechanism;

associating is done at sample level, with default sample grouping; and associating at slice segment level with NALUMapEntry.

4. The method of claim 1, wherein the new slice segment is an independent slice segment or a dependent slice segment.

5. The method of claim 4, wherein the new slice segment is a split of a slice segment into a independent slice segment plus one or more dependent slice segments.

6. The method of claim 1, wherein the new slice segment is displayable.

7. The method of claim 1, wherein the new slice segment comprises one tile.

8. The method of claim 1, wherein the new slice segment comprises a plurality of tiles.

9. The method of claim 1, wherein the new slice segment maps all the tiles of the region of interest.

10. The method of claim 1, wherein the new slice segment maps consecutive set of tiles of the region of interest.

11. The method of claim 9, wherein the number of tiles mapped to the new slice segment is determined by at least one of: user input, encapsulation configuration and an analytics module.

12. An apparatus for encapsulating a video bitstream organized into slice segments, the slice segments comprising a plurality of coding units, the apparatus comprising:

a hardware processor; and a memory storing one or more programs configured to be executed by the hardware processor, the one or more programs including instructions for:

obtaining a region of interest comprising one or more tiles, each tile comprising a set of one or more coding units;

determining whether the region of interest forms part of a slice segment;

if it is determined that the region of interest forms part of a slice segment, defining a new slice segment comprising the coding units of only the region of interest; and encapsulating the bitstream comprising the coding units of the region of interest using the new slice segment if it is determined that the region of interest forms part of a slice segment, and using the slice segment otherwise.

13. A non-transitory computer-readable storage medium storing a media segment file comprising at least part of the video bitstream encapsulated by the method of claim 1.

* * * * *